(12) United States Patent
Samid

(10) Patent No.: US 10,911,215 B2
(45) Date of Patent: Feb. 2, 2021

(54) BITMAP LATTICE: A CYBER TOOL COMPRISED OF GEOMETRIC CONSTRUCTION

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 16/792,093

(22) Filed: Feb. 14, 2020

(65) Prior Publication Data

US 2020/0252197 A1    Aug. 6, 2020

Related U.S. Application Data

(63) Continuation-in-part of application No. 15/594,637, filed on Feb. 12, 2018, now Pat. No. 10,594,480.

(60) Provisional application No. 62/805,369, filed on Feb. 14, 2019, provisional application No. 62/813,281, filed on Mar. 4, 2019, provisional application No. 62/850,720, filed on May 21, 2019, provisional application No. 62/857,898, filed on Jun. 6, 2019, provisional application No. 62/900,567, filed on Sep. 15, 2019, provisional application No. 62/926,560, filed on Oct. 27, 2019, provisional application No. 62/931,807, filed on Nov. 7, 2019, provisional application No. 62/963,855, filed on Jan. 21, 2020.

(51) Int. Cl.
*H04L 9/00* (2006.01)
*G09C 1/02* (2006.01)

(52) U.S. Cl.
CPC ............... *H04L 9/002* (2013.01); *G09C 1/02* (2013.01)

(58) Field of Classification Search
CPC .................................. H04L 9/002; G09C 1/02
See application file for complete search history.

(56) References Cited

U.S. PATENT DOCUMENTS

| | | | | |
|---|---|---|---|---|
| 5,201,000 | A * | 4/1993 | Matyas | G06F 9/30003 380/30 |
| 5,296,687 | A * | 3/1994 | Geronimi | G06Q 20/341 235/380 |
| 5,870,468 | A * | 2/1999 | Harrison | G06F 21/6209 713/165 |
| 2005/0111659 | A1* | 5/2005 | Shirai | H04L 9/0625 380/37 |
| 2006/0143009 | A1* | 6/2006 | Jost | G10L 15/285 704/254 |
| 2006/0239503 | A1* | 10/2006 | Petrovic | G06T 1/0071 382/100 |
| 2009/0113217 | A1* | 4/2009 | Dolgunov | H04L 9/0894 713/190 |
| 2017/0149556 | A1* | 5/2017 | Seudie | G06F 11/3058 |
| 2017/0250796 | A1* | 8/2017 | Samid | H04L 9/0838 |
| 2018/0027013 | A1* | 1/2018 | Wright | H04L 63/1416 726/23 |
| 2018/0351743 | A1* | 12/2018 | Michiels | H04L 9/32 |
| 2018/0373834 | A1* | 12/2018 | Cho | G16B 50/30 |
| 2019/0229894 | A1* | 7/2019 | Samid | H04L 9/085 |
| 2020/0265059 | A1* | 8/2020 | Patel | G06F 16/258 |

* cited by examiner

*Primary Examiner* — Aravind K Moorthy

(57) ABSTRACT

Exploiting the wealth of information in the intricate structure of a network where vertices are interconnected through edges—to insure data integrity between communication partners, where the partners gauge the projected security through the size and complexity of the deployed shared network.

14 Claims, 12 Drawing Sheets

BitMap canvass and Graphc Alphabet (a)

BitMap canvass and Graphc Alphabet (a)

BitMap canvass pinned with Graphlets (b) and ( c)

Fig.-3

BitMap canvass pinned with 4 Copies of Graphlet (a)

Atomic Graphlets Pinned into a BitMap Canvass

A Graphlet with two transformations original graphlet     horizontally flipped 90 degrees rotated Constructing a BitMap Graph by placing 9 atoms in adjancy A BitMint Compliant Graph Three Atomic Graphlets Large Canvass, Small Graphlet

Fig.-8

Composite Ciphertext

Fig.-9 qtext

C ⟶ P1= W...WYWZXYWXXW...W => YZXYX

C ⟶ P2= W... WXZWWWWXXXW...W => XZX

C ⟶ P3= W...WYYXXZXYWXW...W => YXZXYX

Fig.-10

Hiding Empty Message Area

Fig.-11

Exteention Ready Canvass Configuration (atoms)

Composite Ciphertext Compliant Graphlet

W-Ringed Graphlet

Circular Advancement Pathway

Connected Pathway over W-Ringed Graphlets

A 6 Letter BitMap Compliant 3D Graphlet

Layered 2D Canvasses

Pathway over layers of 2D Canvasses

Rock of Randomness Pathway

M = X Z Y Z

Virgin Seal (Rock) Technology

BITMAP LATTICE: A CYBER TOOL COMPRISED OF GEOMETRIC CONSTRUCTION

BRIEF EXPLANATION OF DRAWINGS

FIG. 1: BitMap Canvass and Graphic Alphabet

The figure shows a BitMap canvass comprised of squares (stepping stones) each marked with the letter W, ready to be pinned on with graphic letters, graphlets. The figure also shows three graphlets, (a, b, c) each marked with the plaintext REO alphabet {X, Y, Z, W}, and each graphlet is BitMap compliant. Namely, each graphlet is sufficient to define a BitMap pathway of any length. The graphlets are of various sizes and various shapes.

FIG. 2 BitMap Canvass pinned with Graphlets (b) and (e)

This figure shows graphlets (b) and (c) from FIG. 1, now pinned on the canvass. Since each of the graphlets is BitMap compliant, so is the canvass as a whole. If the pinning information is conveyed in the open then an attacker may know the positions of graphlets (b) and c) on the canvass, but will not know the size and shape of these graphlets.

FIG. 3 BitMap Canvass Pinned with Four Copies of Graphlet (a)

The figure shows how graphlet (a) from FIG. 1 is fitted in four locations on the shown canvass.

Figure 4:
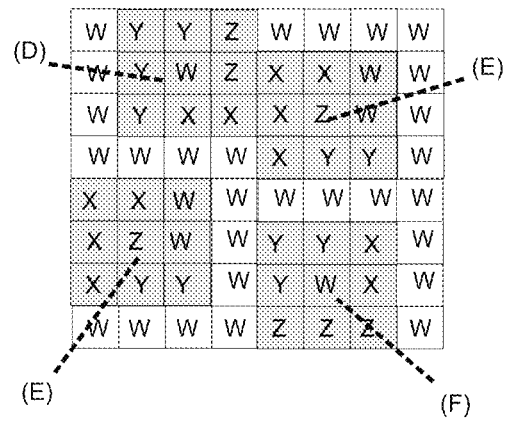
Figure 4:
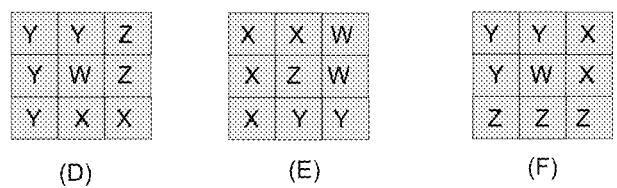

FIG. 4 Atomic Graphlets Pinned into BitMap Canvass

The figure shows three 3×3 atomic graphlets, marked as (d), (e) and (f) pinned on the shown canvass. The graphlets don't exceed the canvass and there is not overlap. Atom (e) is pinned twice. Since every atom if BitMap compliant, so is the canvass as a whole.

Figure 5:
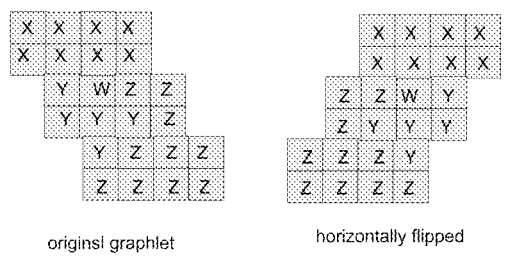
Figure 5:
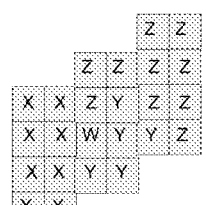

FIG. 5A Graphlet with Two Transformations

The figure shows a BitMap-compliant graphlet in its original form, and next to it, the same graphlet after a horizontal flip—it remains BitMap-compliant. At the bottom the figure shows the same graphlet rotated 90 degrees counter clockwise.

Figures 6, 7:
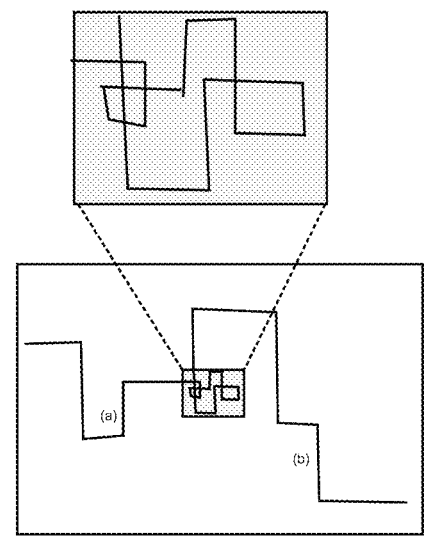

FIG. 6 Constructing a BitMap Graph by Placing 9 Atoms in Adjacency

The figure shows three atomic graphlets at the bottom of the figure, then shows them fitted in complete adjacency onto the canvass. The canvass thereby becomes a fully BitMap compliant BitMap graph.

FIG. 7 Large Canvass, Small Graphlet

The figure shows a small single graphlet (shaded) placed in the middle of a canvass, and the pathway inside it is connected with a header section (a) and a trailer section (b) that extend the pathway from the left side of the large canvass to the right side of the canvass.

FIG. 8 Composite Ciphertext

The figure shows three BitMap canvasses, each canvass pinned with different array of graphlets. Each of these three canvasses is shown to be marked with a pathway—namely a message is written on each of those canvasses. Canvasses 1, 2, and 3, express message $P_1$, $P_2$, $P_3$ respectively. At the bottom of the graph it is shown that the three canvasses are combined into a single canvass, and the three individual pathways are strung together through a W-only pathway. The result is a single pathway that extends from the left side of the combined canvass to the right side of the canvass, and is decrypted to the three messages in a row: $P_1$-$P_2$-$P_3$.

FIG. 9 qtext

This figure shows a composite text, from FIG. 8 being evaluated to each of the three messages C, being decrypted to plaintext P1 by giving the P1 reader a canvass where the parts of messages P2 and P3 are W-washed, namely all the {X,Y,Z,W} markings have been removed, and only the left for the P1 section. The figure shows the plaintext expression to which the composite ciphertext evaluates. The term qtext- is short for equivocation text, and indicates the similarity with qbit.

FIG. 10 Hiding Empty Message Area

The figure shows a canvass with one pinned graphlet. On the upper canvass the plaintext graph is stretched to the left side of the canvass with two long straight lines. These straight line may suggest to an attacker that this section of the ciphertext is a W-section with no meaning. By contrast the example at the bottom of the picture shows the same extension of the graphlet pathway to the left side of the canvass, however the extension simulates the convoluted nature of the pathway as it traverses through a normal BitMap compliant graphlet. The attacker would be hard pressed to recognize the left part of the pathway as W-washed.

FIG. 11 Extensions Ready Canvass Configuration (Atom)

The figure shows atomic graphlets arrayed such that every non-W square is adjacent to a W marked square that is part of the W expanse outside the graphlets, where pathways may be connected to a composite pathway.

Figure 12:
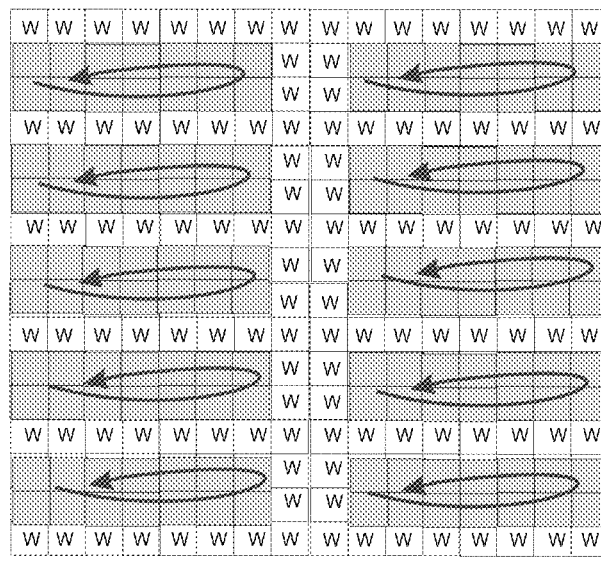

FIG. 12 Composite Ciphertext-Compliant Graphlet

This figure shows a graphlet constructed such that wherever a pathway ends, it has an outlet to the W marked space outside the graphlet. The shaded squares (note: we use the terms squares, stepping stones, memory locations interchangeably) allow for a circular setting of . . . . X . . . . XY . . . . YZ . . . . Z . . . . X . . . . XY . . . . YZ . . . . Z. where each of these squares has a direct contact to a W square with an out let from the graphlet.

Figure 13:
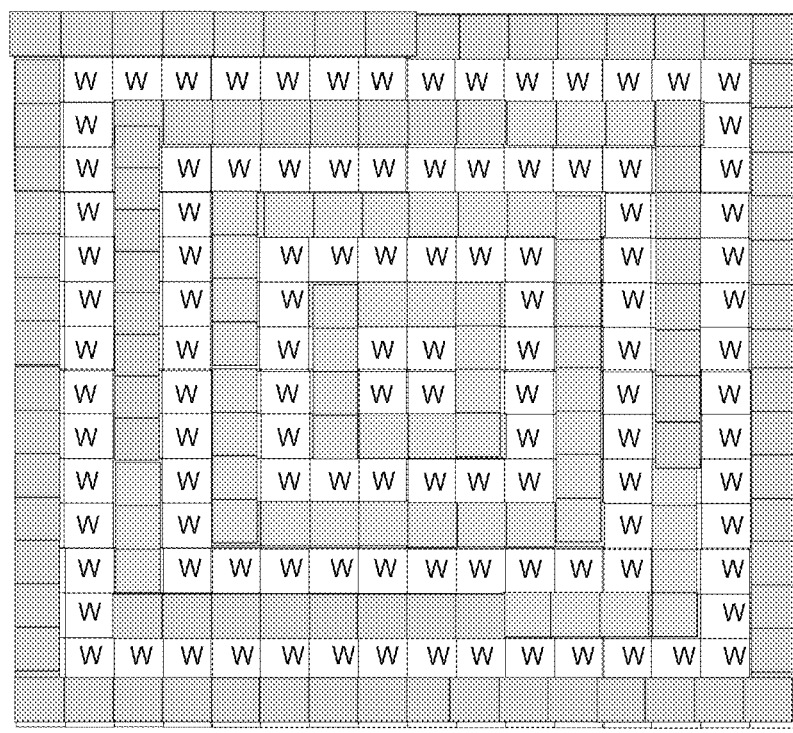

FIG. 13 W-Ringed Graphlet

The figure shows a graphlet marked with concentric squares ("rings") of W marked squares. In between the shadowed areas are reserved for X,Y,Z markings. Such a graphlet allows for a path to start from the inside and gradually proceed to the outer ring, or vice versa to start from the outside then proceed to the center, or to repeating this sequence several times.

Figure 14:
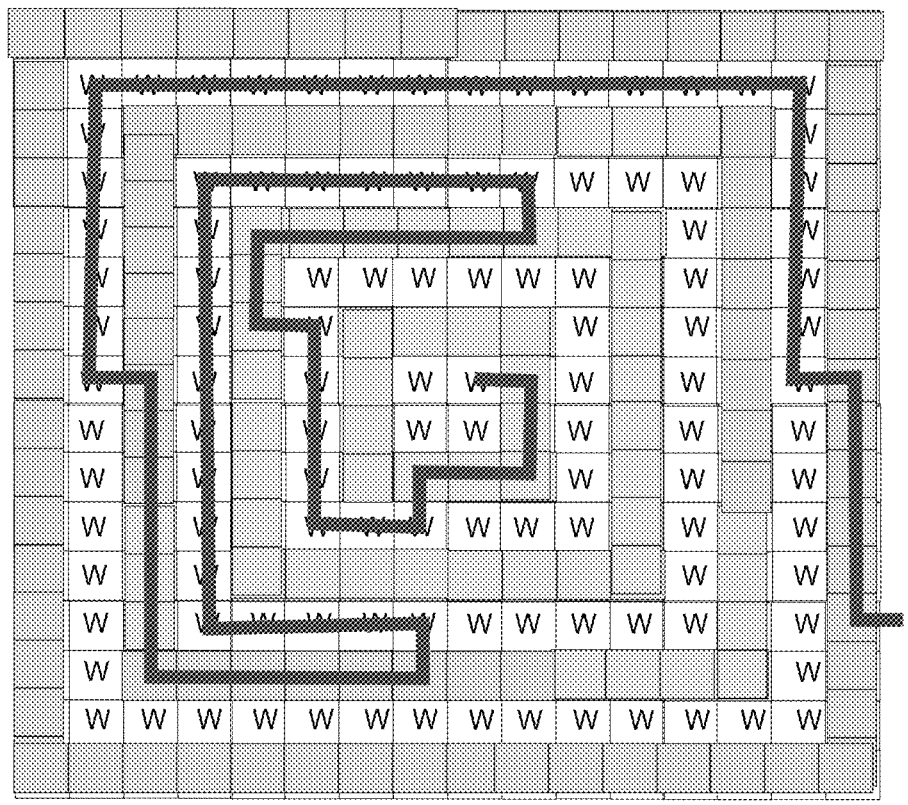

FIG. 14 Circular Advancement Pathway

This figure shows a pathway that begins at the center of the graphlet, and proceeds gradually to the outside rims of the graphlet. Every time that the pathway hits a W it moves to the outer ring, not the more internal ring. The same pathway may be used in reverse from the outer ring to the center, and then repeat as many times as desired.

Figure 15:
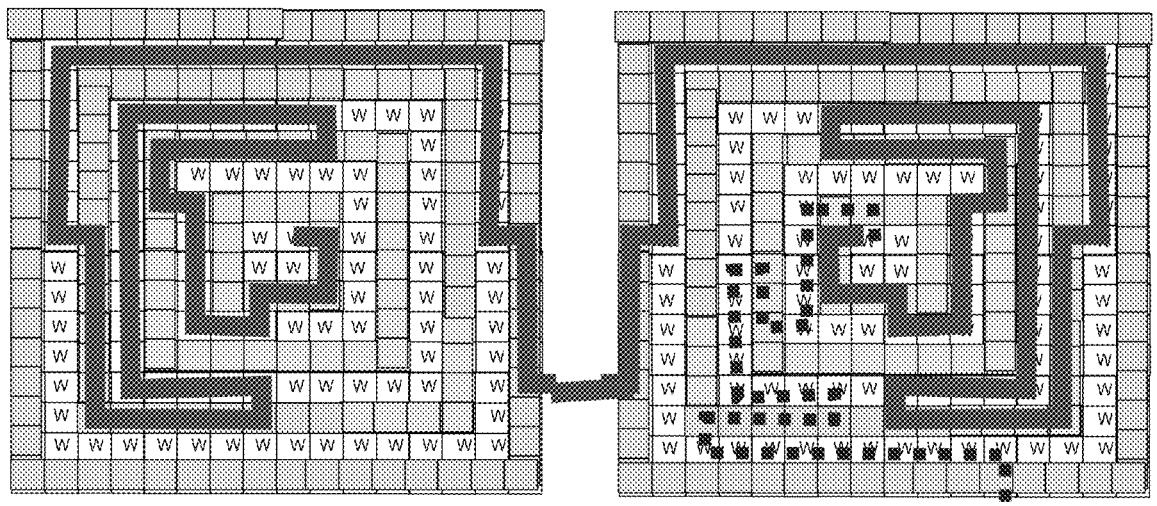

FIG. 15 In and Out Rings Through Pathway

The figure shows how a pathway wriggles itself from the inside of the left side graphlet, through the W-rings to the outside of same graphlet. From there, the pathway starts its "journey" into the center of the right side graphlet. Once in the center, the pathway re-emerges all the way out (see the dotted lines). It is all enabled through the W-rings, and insure a thorough use of the graphlets.

Figure 16:
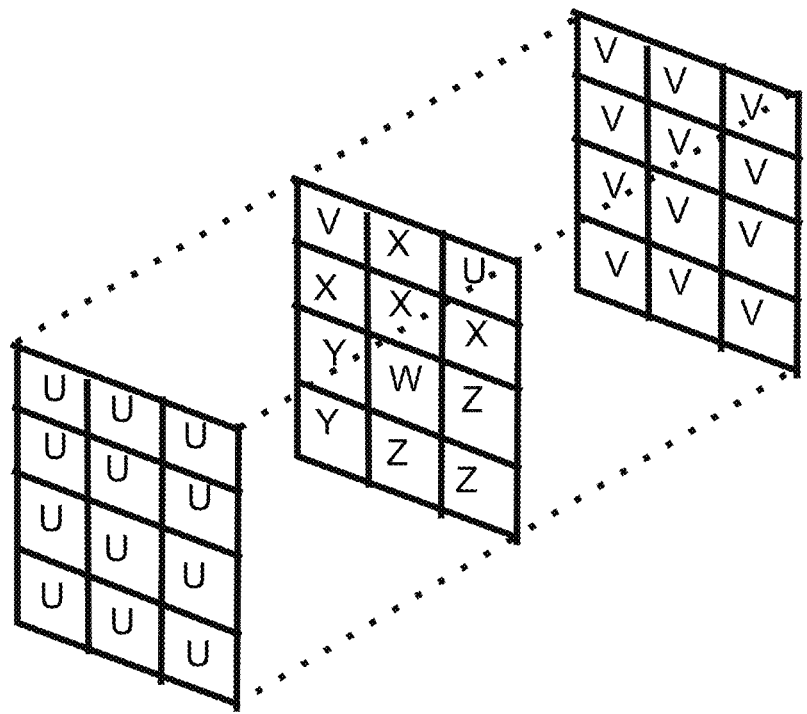

FIG. 16 A 6 Letter BitMap Compliant 3D Graphlet

This figure depicts a three dimensional graphlet featuring 6 letters: X, Y, Z, W, U, V. It shoes three plates, each of 3×4 squares size, which combine to a box 3×3×4 in size. It is easy to see that this box is BitMap-Lattice compliant. From every letter it is possible to arrive at any other letter using only same letters stepping stones.

Figure 17:
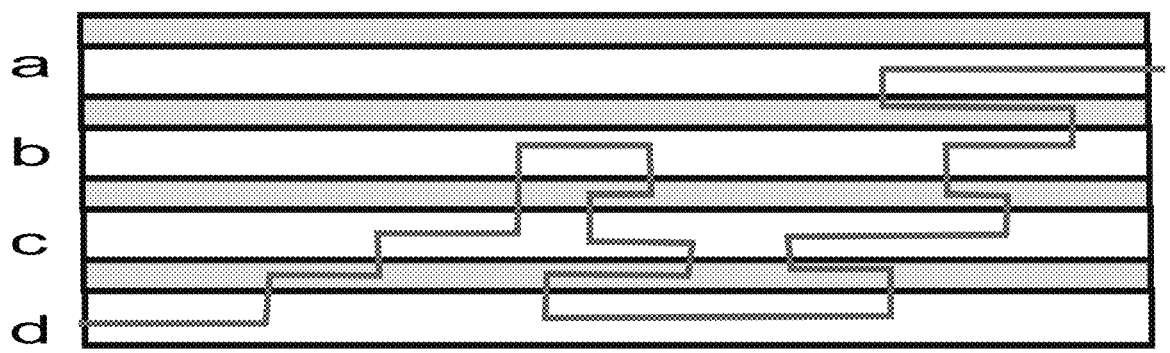

FIG. 17 Layered 2D Canvasses

This figure depicts a side view of layered canvasses marked a, b, c, and d. Between them in shades the figure shows "empty" W-layers. The figure also shows the pathway beginning with canvass d from the left. After some traveling inside canvass d, the pathway turns up to the upper W-canvass, where it proceeds a bit, then climbs up to canvass c, proceeds there, eventually goes up to canvass b before descending down to canvass c and d. The pathway eventually wriggles its way up to canvass a where it terminates.

Figure 18:
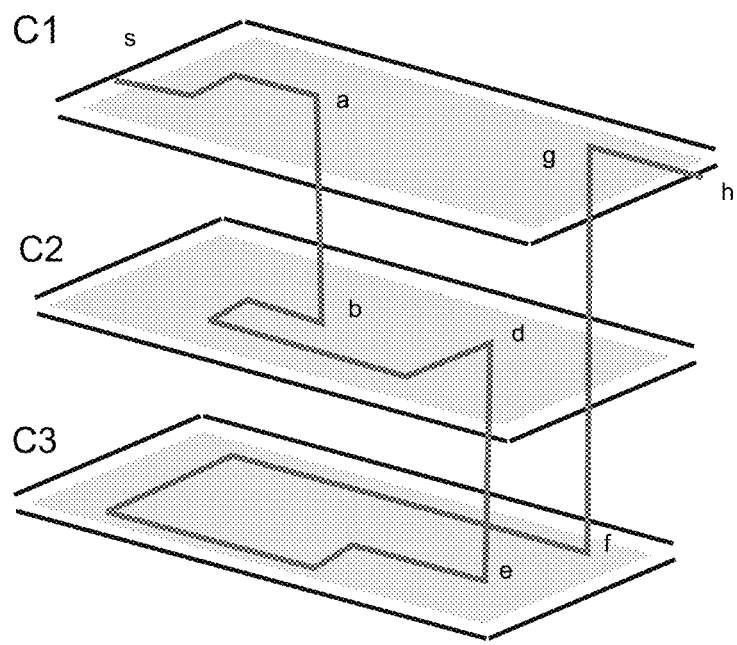

FIG. 18 Pathway Over Layers of 2D Canvasses

This figure shows three layered canvasses C1, C2, and C3 spread apart for visibility (also the in-between W-canvasses are not shown). The figure then shows point s where a BitMap-lattice pathway commences, and moves about in canvass C1 until it reaches to point a, and there it descends to point b in canvass C2. From point b the pathway goes through a particular list of stepping stones until point d. From pint d the pathway leaves canvass C2, and lands at canvass C3, at point e. From there the pathway is shown to go through the opposite side of the canvass before returning to the first side at point f. From point f the pathway rises to point g on canvass C1 and from there to exit and termination at point h.

Figure 19:
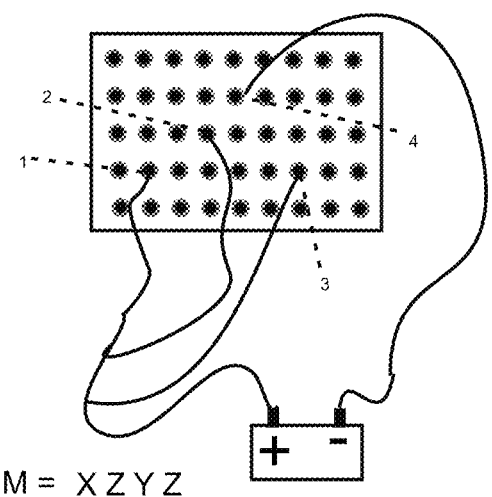

FIG. 19 Rock at Randomness Pathway

This figure shows how a message written with four letters X, Y, Z, and W, which is M=aXZYZ guides a pathway on a rock of randomness. The figure shows the rock comprised of 9×5 ports (shown as circles) where each port is randomly assigned a letter from the plaintext alphabet: X, Y, Z, and W. (shown above the rock). Message M begins with letter X, so the transmitter selects a port marked X. The selection comes to point $s_{42}$, which is marked X. The point address is communicated to the intended recipient. The next letter in M is Z. The transmitter therefore selects port $s_{34}$, and communicates to the intended recipient the resistance measurements from the first point to the second. The reading allows the intended recipient to identify $s_{34}$ as the 2nd point, and thereby realize that the second letter in M is Z. Same for the third letter, which is Y, which the transmitter selects as port $s_{47}$. The 4th point is Z and the transmitter selects port $s_{25}$. The transmitter then combines all the previous point of the pathway into a single electric polarity, "+" as shown, while the 4th point $s_{25}$ is fitted with the opposite polarity ("−"). The effective resistance is measured. It depends on the identity of all the ports that participated in the pathway before. The reading of this resistance is passed to the intended recipient who will identify on the recipient copy of the rock that the 4th letter on M is Z.

Figure 20:
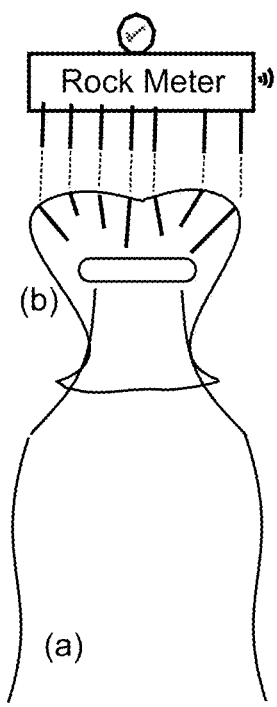

FIG. 20 Virgin Seal (Rock) Technology

The figure shows a bottle sealed with rock material (b) fitted with a standard array of ports. The figure also shows a "Rock Meter" with an array of electrical contacts that fit into the array of ports, and hence can measure the resistance between any group of ports united through one polarity and any counter group of ports united in the opposite electrical polarity. This resistance is compared to a logged resistance that the meter receives via WiFi (shown on the right of the meter) from a product database. If the reading matches—the seal is virgin.

Introduction

U.S. Pat. No. 6,823,068 describes a simple concept where a map trajectory property is recruited as a cryptographic tool. The basic procedure of that patent served as a basis for the section about "drone cryptography" related in patent application Ser. No. 15/594,637, which is herewith being continued. The continued patent application introduced a novel method to quickly and efficiently implement the underlying patent mentioned above (U.S. Pat. No. 6,823, 068). The essence of the idea in the said patent application was to build a graph (a cryptographic key) as a combination of a relatively small sets of 'graph section'. These graph sections as described in application Ser. No. 15/594,637 were all of the same small size. In this continuation this idea of building a cryptographic key (a map) from graph or map elements, is further developed. The described methods and systems herein are designated as BitMap-Lattice.

In the following sections we (i) first overview the basic procedure of the underlying patent, (ii) describe the innovation in continued application Ser. No. 15/594,637, and (iii) elaborate on the advancement presented in the current continued application.

BitMap Overview

The method identified in U.S. Pat. No. 6,823,068 is more commonly called BitMap. It is based on the idea that a pathway on a graph marked by vertices and edges may be specified in two ways: through the visited vertices and through the traversed edges. Knowledge of the graph (the map) allows one to readily switch from one description to the other. Alas, without knowledge of the graph layout such transformation is not possible. This configuration allows one to regard the vertex-description as a plaintext, the edge-description as ciphertext (or vice versa), and the graph itself may be regarded as the cryptographic key. All that is needed is a way to assign names to the vertices and edges in the graph.

The BitMap design calls for each vertex to be give a "vertex letter" from a "vertex alphabet" and for each edge in the graph an "edge letter" must be assigned from an "edge alphabet". The two alphabets may be the same or may be different. The graph may be large or small and otherwise be built in any way graphs can be built, as long as it complies with the following three condition:

Every letter in the vertex-alphabet is associated with at least one vertex on the graph.

Two edges projecting from the same vertex cannot be marked with the same letter. From every vertex on the graph there is at least one pathway to any other vertex on same graph.

From any vertex marked by an arbitrary letter x, there is a pathway to another vertex marked by other letter y≠x where the visited vertices on that path are all marked as x. (the connectivity condition).

The patent specification proves that any graph that subscribes to these limitations may be used to encrypt plaintext of arbitrary length.

Any graph compliant with the above conditions—regardless of its size—will allow a plaintext comprised of a sequence of letters such that there is no letter repetition in the plaintext, to be mapped as a pathway on such a graph. The third condition above will replace the original plaintext sequence with a sequence that has repetition, but when decrypted these repetitions will be removed since it is known that the original plaintext had no repetitions.

BitMap in U.S. patent application Ser. No. 15/594,637

We name the BitMap proposal in U.S. patent application Ser. No. 15/594,637 as BitMap-Gbits, where "Gbits" stands for "graph bits". The innovation here is to build small graph sections, "graphlets", or graph bits (gbits) from which to construct a proper BitMap graph.

The underlying idea of graphlets is the following: Let $G_1$, and $G_2$ be two compliant BitMap graphs. Let $G_{12}$ be linked graph of $G_1$ and $G_2$, then this linked graph, $G_{12}$ is also BitMap compliant.

It is easy to prove this premise. Two graphs are linked if at least two vertices one on each graph are connected with an edge. Thereby one could traverse from any vertex on any graph to any vertex on either graph. The only vertices affected by a linkage are the ones which are actually linked.

But linking just added a connection, it did not remove one. Each of the linked vertices was compliant before the linking, so the additional link will not affect such compliance on either side.

Based on this linkage compliance it is possible to build a large graph $G_{large}$ by linking a large number of small compliant graphs. $g_1, g_2, \ldots g_t$ and be sure that $G_{large}$ is BitMap compliant.

This would be very helpful because given an arbitrary large graph $G_{large}$ it may be an intractable calculation to insure that it is compliant with the BitMap connectivity condition. But by assembling small compliant graphs together it is possible to readily construct a large graph which is guaranteed to be compliant.

The BitMap graphlets idea is then to define a "graph alphabet" comprised from the smallest compliant graphlets, or graph sections, and then put these letters of the graph alphabet in a cross linked mode, and assemble a large as desired fully compliant BitMap graph.

In the referenced application this was done by:

1. expressing symbols in a three letters alphabet: X, Y, Z. Most of the symbols in the ASCII table may be expressed through combinations of 5 such letters: $3^5=243$ (out of 256 ASCII options). Thereby every plaintext P will be expressed as a string comprised of the symbols X, Y, and Z, where every 5 such letters represent a symbol from the ASCII table.

2. removing duplication by sticking the letter W between any repetition like XX, YY, ZZ. The result is a four symbol string (X, Y, Z, W) with no repetition.

3. building the BitMap graph (map, key) to be shared between the communicating parties by linking together "graphlets". In particular we use "atomic graphlets" or "atoms", which are the smallest graph that is BitMap compliant. This is a 9 vertex graph set up as a central vertex projecting an edge in the directions up, down, right left to 4 vertices. The two vertices projected from the right and left edge, each project a pair of edges up and down to 4 more vertices, called the "corner vertices". The two vertices projected from the up and down edges from the central edge, each projects a pair of right and left edges to the corner vertices. This defines a graph comprised of 9 vertices. The central vertex projects 4 edges (up, down, right left, or say U, D, R, L) the corner vertices project 2 edges each (one horizontal and one vertical), and the other four project 3 edges each, one towards the central vertex and two towards a corner edge. This 9 vertex graph may be viewed as a 3×3 matrix or a 3×3 table where edges are represented as either horizontal or vertical boundaries between cells of the table.

4. In the referenced application it was shown that this small 9 vertex graph (graphlet) may be configured in many ways where each way the graphlet is BitMap compliant. For example

| X | X | Y |
|---|---|---|
| Z | W | Y |
| Z | Y | Y |

The above graphlet will serve to encrypt a plaintext of any length. Of course the pathway will bounce back and forth within the vertices (and the respective edges).

The referenced application has evaluated the number of distinct 9-edges graphlets configured as a 3×3 table, and regarded them as the "graph alphabet". These atomic graphlets may be linked together in various combinations.

The linking is simple. Two 3×3 table format graphlets may be put adjacent to each other horizontally or vertically and thereby define a 3×6 table or a 6×3 table. Since every graphlet is BitMap compliant, so is their combination. For example, the above 3×3 graphlet, all it a, can be put vertically adjacent to another graphlet called β:

| W | W | W |
|---|---|---|
| Z | X | W |
| Z | Y | Y | to yield:

| X | X | Y |
|---|---|---|
| Z | W | Y |
| Z | Y | Y |
| W | W | W |
| Z | X | W |
| Z | Y | Y |

Similarly graphlets α and β may be string horizontally in some way, for example: $\alpha\alpha\beta\alpha\beta\beta\beta\alpha, \ldots$.

or construct a two dimensional p×q matrix where each cell $m_{ij}$ (i=1, 2, ... p, j=1,2, ... q) is associated with one atomic graphlet from the graph alphabet. Such matrix amounts to a large BitMap compliant graph.

Two communication partners deciding on a shared Bit-Map graph will have to agree on a "graphlet matrix" as described above—some two dimensional table-wise configuration of the graph alphabet.

BitMap Lattice Overview

The BitMap-Lattice design extends the foundation of the continued application in two ways: 1. Canvass 2. Open graph alphabet The idea of the canvass is a large p×q trix, (p, q are positive integers), or table where all cells in the matrix are marked with W. The cells are squares in a lattice which is the canvass. The squares are also the vertices of BitMap graph. And every cell is connected to all the other cells with which it has a joint edge. That edge is the edge connecting the two squares who share an edge. The edges are marked from the point of view of each square, namely Up, Down, Right, or Left (U, D, R, L). In the beginning the canvass, or the canvass board has al its p*q vertices (squares) marked W). On this platform one would pin graphlets. A graphlet is any size set of squares, where the squares are marked with graph letters. The squares of the graphlet are the vertices and the joining edge of two squares on the graphlet is the edge that joins these two vertices—just like the canvass is built. Furthermore, the size of the graphlet squares is the size of the canvass squares. A graphlet is full-fledge BitMap map. It is BitMap compliant. The BitMap—lattice procedure calls for a graphlet to be fitted on the canvass, and thereby every square of the canvass which is overlaid by a square of the graphlet is adopting the letter marked on the covering square of the graphlet. Even if a single graphlet is so fitted (laid over) the canvass in some way, leaving all the other squares (not laid over by the graphlet) to remain W marked then the the whole canvass with its p*q squares will be rendered a BitMap compliant graph. And of course the canvass will remain so if one keeps pinning to the platform more and more graphlets. The graphlets can be pinned in any order and any combination as long as there is no overlap. No vertex marked as W in the pre-pinning, virgin canvass will be covered by more than two graphlets. A second rule is that every pinned graphlet will not extend outside the boundaries of the canvass. Every one of the graphlet vertices will come on top a vertex W of the platform.

The open graph alphabet simply broadens up the definition of graph letters from the basic idea that every letter is a 3×3 BitMap compliant table or matrix, to an open field where graphlets may include arbitrary number of vertices and be geometrically freely shaped. As long as the graphlets are BitMint compliant and abide by the rules above, they will qualify as parts of a "puzzle" defined as a canvass with pinned graphlets—a BitMint compliant graph.

The graph canvass and the open graph alphabet allow for a very flexible way for communication partners to exchange graph information. They have an a-priori secret graph alphabet, and then in the open they may indicate where to pin which of the named letters—the shape and content of which is not publicly known. Such pinning may be defined with a variety of indicators, like which vertex is the 'origin' of the graphlet, whether or not the graphlet is rotated in 90 degrees steps, or symmetrically flipped horizontally or vertically. This ease for changing the content of the BitMap graph can be used in protocols where the graph changes often, including every exchange.

Tiling: The BitMint graph canvass may be viewed as a tile that may be repeated to generate an open-ended surface, so that the pathway may also appear extending over and beyond without having to repeat itself. The repetition may be combined with action like: when adding a tile to the right, then rotate all the graphlets 90 degrees counter clock direction. And when extending the canvass—the tile—to the next tile up vertically, all the graphlets are flipped vertically over the line where the origins vertex is found.

This BitMap-Lattice innovation comes with advantages: (i) effective graph dynamics, and (ii) multi-message ciphertext. These advantages allow for a user-determined level of security and for hiding communication pattern, as well as document management advantages.

Formalities

We define a plaintext-alphabet as comprised of three letters: X, Y, Z. Every digital message can be expressed through the plaintext alphabet, in the form of a string comprised of the letters of this alphabet. And when so it is regarded as "BitMap-Lattice plaintext".

We now define an operation known as the "repetition elimination operation" (REO). It operates by placing a 4th letter, W, between any pair of letter repetition. So every occurrence of XX becomes XWX and every occurrence of YY becomes YWY, and every occurrence of ZZ becomes ZWZ. The output of REO is a 4-letter plaintext free of repetition, called "REO plaintext". The REO plaintext is written with 4 letters (The Lattice REO alphabet) while the BitMap-Lattice plaintext is written with three letters only.

For example the word "Hi" may be represented through a plaintext alphabet based on letter mapping like this: H="XXYYZ" and i='XYYYZ'. Accordingly we write Hi=XXYYZXYYYZ. Then we remove repetition by introducing Ws: Hi=XWXWYWZXYWYWYZ.

We now define a p×q matrix (or alternatively p×q table), where cell $m_{ij}$ represents the cell of the matrix found in row i and column j (i=1,2, ... p; j=1,2, ... q). There are pq cells in the matrix. We regard this matrix as "The BitMap graph", or "The BitMap key".

Each cell in the BitMap graph is assigned one letter from the set X, Y, Z, and W. Each letter in the Lattice-REO alphabet (X, Y, Z, W) is associated with at least one cell on the matrix. (The full presence condition).

We now define a "pathway" on the BitMap graph as a sequence of cells such that any two adjacent cells $m_{ij}$, $m_{kl}$, comply with the 'adjacency condition':

$$|i-l|+|j-l|=1$$

A pathway starts with the starting cell and ends with the termination cell. It is called a "cell pathway" or "pathway".

The adjacency condition ensures that every two adjacent cells on the matrix are either direct neighbors horizontally or direct neighbors vertically. Accordingly a pathway can be completely described by specifying the starting cell and then specifying the direction to be taken to move to the next cell in the matrix. There are four possible directions: up, down, right and left. Marked as U, D, R, and L. And so any sequence of matrix cells on the graph can be equally described by the starting address (starting cell), and a sequence comprised of the letters U, D, R, and L.

This is a critical BitMint premise—the equivalence between describing a pathway as a sequence of matrix cells (the cell pathway) and as a sequence of directions (expressed as a choice between up, down, right and left) to be taken beginning with the starting cell.

This equivalence holds regardless of the length of the sequence, and regardless whether the sequence re-visits cells any number of time. The information content in a list of matrix cells and a list of directions of up, down, right and left together with the starting cell, is the same.

Suppose now that a REO plaintext can be fitted as a pathway such that by listing the letters associated with the matrix cells of the pathway one builds the exact sequence of the REO plaintext, then this pathway can equally be expressed per it starting cell and the list of directions: up, down, right, and left from it. Both expressions—the list of matrix cells and the list of directions ahead from each cell will capture exactly the same information.

The question is now how to fit an arbitrary REO plaintext to a proper pathway on a given BitMap graph (matrix). By virtue of the REO plaintext being in REO status, it is by construction that it has no repetitions. No sequence of XX, nor YY, nor ZZ and nor WW. This fact allows one replace any letter in the REO plaintext with any number of same letters. Such "inflation" or the REO plaintext can readily be 'corrected'. The fact that the REO plaintext has no repetition will guide to eliminate all instances of repetition in the inflated plaintext and thereby regenerate the REO plaintext. This fact implies that we may fit a REO plaintext into a pathway by fitting any inflated version of it. That is because as discussed right above, the inflated version can readily be deflated to the generating REO plaintext.

Until now we imposed only one condition on the way the matrix cells will be assigned to the REO alphabet {X, Y, Z, W}: each of these four letters will have to be assigned at least once. Namely there must be at least one matrix cell that is assigned an X letter, one cell at least assigned a Y letter, one cell at least assigned a Z letter, and one cell at least assigned a W letter. We are now about to add another condition: 'the continuity condition'. It states:

The continuity BitMap condition: Let L be a REO alphabet letter L:{X, Y, Z, W}, and let L' also be a REO alpha letter different from L: L L'. then from any matrix cell marked with L there shall be a pathway comprised solely with L letters, except for the termination cell which will be associated with L'. This condition applies to any matrix cell for any letter L and for any letter L' (the continuity condition).

We regard a graph comprised of a matrix where the cells are associated with REO alphabet each, and which is compliant with the "full presence" condition and with the "continuity BitMap condition" as a "BitMap Lattice compliant graph".

We will show now that a BitMap-Lattice compliant graph will fit any REO plaintext of any size.

Proof. Let an arbitrary REO plaintext include a REO alphabet letter L {X, Y, Z, W}. The 'full presence' condition guarantees that one cell in the matrix will be assigned the letter L. We will start the pathway at such a matrix cell. The next letter in the sequence is L' L. We know that because a REO plaintext has no repetition, so the 2nd letter in the sequence is different from the first one. The continuity condition assures us that there is a pathway leading from the first cell marked with L to some cell marked with L' with the intervening cells are all marked L. We use this pathway traversing from the first cell to the cell marked L' (passing through cells all marked with the letter L). The third letter in the REO sequence is L", which we know by the construction of the REO plaintext is different from L': L'≠L". L" may or may not be equal to L. The continuity conditions assures us that from the matrix cell marked with L' there is a pathway to matrix cell marked with L" where all the intervening cells are marked with L'. We take that pathway and end up on a matrix cell marked with L". Now the next letter in the REO sequence, is different from L"(L"≠L"), and again the continuity condition assures us of the existence of a pathway from the cell marked L" to the cell marked We continue with this logic until we arrive at the last letter of the REO plaintext. We have thereby marked a pathway on the matrix that starts with the first letter of the REO plaintext and ends up with the last letter in the REO plaintext. When one writes down the letters marked on each of the cells of the matrix in the pathway one lists the sequence of REO alphabet letters as they appeared in the REO plaintext, except that each letter in the REO alphabet may be represented by a sequence of the same letter. Every letter of the REO alphabet, L on the REO plaintext will be represented by a series of LLLL . . . . L sequence on the matrix pathway.

This will be an inflated REO plaintext, which we have seen is easy to deflate to the original REO plaintext. We simply collapse any repetition to a single letter.

So we have proven that any REO plaintext may be written as inflated version thereto on a BitMap compliant graph appearing as a pathway on the graph. We have also shown that such a pathway may be equally expressed as the starting matrix cell and a sequence of directions: Up, down, right left. The series of directions and the series of matrix cells bearing the same information. So the a REO plaintext may be mapped into an inflated sequence on a BitMap compliant graph, and that graph can be expressed as a sequence of directions such that the sequence of directions plus the starting cell will point to the matrix cell sequence and the marking of REO alphabet on it will comprise an inflated REO plaintext which will readily be deflated into the original REO plaintext.

To exercise this back and forth in expressing the REO plaintext, it is necessary to be in possession of letter assignment of the matrix, namely to know which cell of the matrix is assigned to which of the REO alphabet letters. Without such cell-to-letter assignment it is impossible to draw a pathway and it is equally impossible to translate back a series of directions {U, D, R, L} to a REO plaintext.

We therefore have established here the necessary elements for encryption and decryption. Any arbitrary plaintext can be expressed via the three letters BitMap-Lattice alphabet {X, Y, Z}. The result, the BitMap-Lattice Plaintext, can be transformed into its REO equivalent, by adding the letter W to break all repetitions. The REO plaintext can be expressed as a starting cell on a BitMap matrix and a sequence of up, down, right, left directions. This sequence will be regarded as the ciphertext, ready to be passed around to its destination going through hostile territory. The hostile having no possession of the way the matrix is assigned cell-to-letter (of the REO alphabet) will not be able to translate back, decrypt, hack the sequence of directions to the original plaintext, but the intended reader who is aware of the matrix letter assignment (the BitMap graph) will be able to decrypt the sequence of directions to the original plaintext.

Ahead we talk about methods to construct and communicate a BitMap compliant graph.

Constructing a BitMap Compliant Graph

The simplest way is "brute force": use a random source to randomly assign a REO alphabet letter to any cell in a given BitMap matrix. Once the cells are assigned, then one checks cell by cell to see if the entire matrix is compliant. If yes, construction is complete. If no then the process repeats, a new randomized assignment of letters to matrix cells. This strategy will be more daunting as the size of the matrix increases.

Two other systems are: (i) assembling of atomic graphic units ("atoms"), and (ii) Canvass.

Atomic Graph Construction

The smallest BitMap compliant graph fits into a 3×3 matrix. There are a few hundred distinct letter assignments of this table. This list of so called "atomic graphlets" or "atoms" can be arrayed in a p×q "atomic matrix" where the matrix cells are atoms. Since atoms are BitMap compliant, so is any array of atoms. The atomic matrix will feature $h^{pq}$ distinct arrays. where h is the number of atoms shared by the communication partners.

The atomic method of graph construction can be extended to non atomic graphlets. For example a 3×4 matrix is not atomic. It can be structured in BitMap compliance in h' ways, and then a full fledged BitMap graph is constructed from setting up a matrix of these unit graphlets by putting them adjacent (vertical and horizontal) next to each other.

Canvass

The idea of a canvass is to build a large matrix and initially assign each cell in it with the letter W. This is the empty canvass. On this empty canvass one would paint (or pin) one or more BitMap compliant graphs thereby turning the canvass as a whole into a BitMap compliant graph.

While the shared graphlets are pre-agreed, the choice of canvass (size and geometry) may be re-selected every so often, even every transmission. The pinning strategy may also be communicated in the open. Secrecy is confined to the shared graphlets: their size, shape and their marking with the graphlet letters X, Y, Z and W.

The canvass, or the canvass board may be expressed in software or in hardware. Same for the graphlets—software or hardware. The pinning may be a logical action or a physical action. Any plaintext of any large as desired length (number of plaintext letters n) may be expressed as a pathway in a small as desired graphlet (even an atomic graphlet) because a graphlet if BitMap compliant. A single small graphlet may be pinned in a very large canvass. The pathwas formerly marked on the graphlet may be extended through a leading section comprised of as many as desired W marked squares on the canvass, (1), and extended through a trailing section comprised of as many as desired W marked squares on the canvass (t), The resultant pathway comprised of l+n+t squares will evaluate to exactly the same plaintext as the n squares size pathway on the graphlet because the leading and trailing sections are comprised of W marked squares that collapse and are removed in decrypting the pathway to the generating plaintext. The outside observer, though, will not realize that what appears as a large pathway comprised of l+n+t squares is indeed a small message comprised of n squares.

Note that both expressions of the message—the REO plaintext and the sequence of directions (U,R,D,L) ciphertext are written through a four letter alphabet, and can be expressed as a bit sequence where every pair of bits represents a letter.

Procedure (Basic)

The BitMap-Lattice basic procedure involves the following elements:

1. a group of g>1 communication parties 2. BitMap-Lattice Software 3. Shared BitMap graphic alphabet, graphlets, (comprised of L letters). 4. Mapping Procedure of an arbitrary bit-string to a shared 3 letters $\{X, Y, Z\}$—the plaintext-alphabet. 5. Shared use policy Its operation is comprised of
Preparation for secure transmission
Encryption and Transmission by the transmitting party
Receiving and Decryption by the recipient party.

The object of this operation is to securely transmit a digital message M from the transmitting party to the receiving party.

Preparation for Nominal Use

1. The group of communication parties, the "Group," agree on a shared BitMap software, shared alphabet and shared use policy.

2. The Group agrees on a mapping procedure of an arbitrary bit string to the plaintext alphabet.

Nominal Transmission: Communication party i wishes to send a message M written in some original alphabet as $M_o$, of an arbitrary number of bits, m, to communication party j (i,j=1,2, . . . g. i≠j). Following the use policy party i will:

1. map M to to the agreed upon plaintext alphabet comprised of 3 letters $\{X, Y, Z\}$: $M_o \rightarrow M_p$ 2. Express M with the corresponding REO-alphabet (4 letters alphabet, $\{X, Y, Z, W\}$). $M_p \rightarrow M_r$—removing repetition by adding letter W.

3. Determine a message canvass, of size p×q cells.

4. Determine the starting point s on the canvass (specifying row and column).

5. Building the encryption/decryption key (the mosaic of graphlet—graphic alphabet—on the canvass).

6. Communicating the mosaic to party j (the canvass board with the graphlets pinned onto it).

7. Marking $M_r$ on the canvass from the starting point s over the mosaic. Identifying a sequence of squares on the graphlet-pinned canvass, such that this sequence corresponds to the sequence in $M_r$, except that every letter may be repeated an arbitrary number of time. The sequence with the repeated letter becomes the inflated plaintext. The so marked sequence of squares on marked canvass (the mosaic) becomes the pathway of the message on the used canvass.

8. Expressing the marked pathway as a sequence of directions: up, down, right, left (U, D, R, L). which is regarded as the respective ciphertext: $C_r$ starting at the designated starting point.

9. Communicating $C_r$ (the ciphertext) to party j.

Nominal Interpretation: Party j in receipt of the (i) the canvass, (ii) the mosaic, (iii) the starting point for the pathway on the canvass, and (iv) the ciphertext $C_r$ will:

1. set up the canvass with all p×q cells marked with the letter W.

2. Build the mosaic on the canvass as instructed by the transmitter party i

3. Draw the ciphertext, $C_r$, on the canvass with the mosaic marked on it, and express the ciphertext through the list of visited cells on the canvass as marked by the mosaic. This will recreate the inflated plaintext on the marked canvass. 4. The recipient party will then deflate the inflated plaintext, but collapsing all repetitions, there by extracting the deflated plaintext, which is the message M written in the REO alphabet: $M_r$.

5. The recipient party will eliminate the W letter from $M_r$ to write M in the plaintext alphabet: $M_r \rightarrow M_p$ 6. The recipient party will apply the agreed upon mapping procedure to switch from the plaintext-alphabet to the original alphabet: $M_p \rightarrow M_o$.

Thereby M has been securely transmitted from the transmitting party i to the recipient party j.

Involved Elements

The BitMap-Lattice basic procedure involves the following elements:

1. a group of g>0 communication parties 2. BitMap-Lattice Software 3. Shared BitMap graphic alphabet (comprised of t letters). 4. Mapping Procedure of an arbitrary bit-string to a shared (t-1) letters alphabet (t=2.3 . . . . )—the plaintext-alphabet. 4. Shared use policy The group of communication party may be of size g=1 or larger. If g=1, one party encrypts messages for subsequent reading. if g>2 then the group may share the same cryptographic key, or every pair in the group may share a key, or some other key sharing configuration.

All the parties in the group will use the same BitMap-Lattice software, which may be open to the public. It contains no secure elements.

Shared BitMint Graphic Alphabet

The shared BitMint graphic alphabet is the home of the shared secrecy of the communicating parties. If it is compromised the method is compromised and the ciphertext reveals the plaintext.

The alphabet is comprised of t letters, for l=1, 2,3, the higher the value of l the greater the security potential of the cipher. A graphic letter is alternatively called a graphlet.

Contiguity: A graphic alphabet letter is comprised of c squares such that from each square i, i=1,2, . . . c to any square j, j=1,2, . . . (i−1), (i+1), . . . c it is possible to mark a sequence of squares where each square in the sequence has a shared edge to the next square of the sequence.

The squares of the graphic letters are of the same size as the squares of the canvass, so that a graphlet may be superimposed on the canvass such that each square of the graphlet is overlaid over a square of the canvass.

One of the c squares on the graphlet is arbitrarily set to be the "pinning square". That is the square that is to be pinned down to the square over which the graphic letters are fitted. So that if the parties decide to fit graphlet x on square a on the canvass, then the "pinning square" of graphlet x will be fitted (overlaid) on square a on the canvass. The pinning square is designated as $s_{00}$, where square $s_{ij}$ is the square to be found i rows above the row of the pinning square, if i>0. and found i rows below the pinning square if i<0. $s_{ij}$ is also to be found j columns to the right of the column of the pinning square for j>0 and found j columns to the left of the pinning square for j<0.

The contiguity condition may be expressed as follows for for every square s in the graphic letter, there exists at least another square $s_{kl}$ such that:

$$|i-l|+|j-l|=1$$

We define a pathway over a graphlet, or over a canvass, as a sequence of squares over the graphic letter as an ordered list of squares such if $s_{kl}$ is next in the sequence to $s_{ij}$, then it holds that:

$$|i-l|+|j-l|=1$$

The squares of the graphic letter are each marked with one of the REO-alphabet letters: X, Y, Z, or W.

The marking of REO letters are such that they comply with the continuity condition stating that from every square on the graphic letter there is a sequence of squares terminating with each of the other letters in the REO alphabet such that all the squares other than the last are marked with the same letter as the first square in the sequence.

The construction as described above is regarded as Bit-Map-Lattice compliant graphic letter.

Note that c is unlimited for size, although its minimum value is c=9. The shape of the graphic letter may be regular or odd.

We now elaborate on (i) pinning a graphic letter on the BitMap canvas, (ii) key construction strategies Pinning a Graphic Letter on the BitMap Canvass We regard a BitMap canvass of size p rows and q columns—an array of pq squares. Let G be a graphic letter compliant with the BitMap requirements. G comes with an indication for one of its squares to be the pinning square, marked as $s_{00}$. In order to pin G on the canvass one would align the pinning square of G on the intended canvass square, (k,l), where k=1,2, . . . p and l=1,2, . . . q. The address of the pinning square on the canvass will be $r_{k+0, l+0}$, and the address of any square on G, $s_{ij}$ on the canvass will be $r_{k+i, l+j}$.

There are two conditions for pinning a graphic letter on the canvass: (i) no square on G can be extended beyond the canvas, (ii) no two graphic letters may share any canvass spot. So no square on G can be left without overlapping a square on the canvass, and no square on the canvass may be overlapped by two or more squares from graphic letters.

To pin a graphic letter (graphlet) on the BitMap-canvas, one would select an address (a square) on the canvas onto which the pinning square on the graphlet will be fitted. When two parties share the canvass and the graphic alphabet, then any of them can communicate to the other "pin graphlet x on square (k,l), on the canvass". As long as the pinned graphlet does not overlap a previously pinned graphlet and does not have any of its squares seated outside the canvas, then the pinning is well defined.

The exact positioning of the graphlet (the graph letter) is either nominal, or transposed. In the nominal option, square $s_{ij}$ on the letter G will overlap square $c_{kl}$ on the canvass where: k=u+i, and l=v+j, where (u,v) are the coordinates of the canvass square where the graph letter has been pinned, namely on row u and column v.

Transposition may take place through "vertical flip" in which the address of square $s_{ij}$ on G will overlap square $c_{kl}$ on the canvass where k=u+i, and l=v−j.

Transposition may take place through "horizontal flip" in which the address of square $s_{ij}$ on G will overlap square $c_{kl}$ on the canvass, where k=u−i, and l=v+j.

Transposition may take place through "clockwise 0.5a rotation" or simple "clockwise rotation" in which the address of square $s_{ij}$ on G will overlap square $c_{kl}$ on the canvass, where k=u+j, and l=v−i Transposition may take place through "counterclockwise 0.5a rotation" or simple "counterclockwise rotation" in which the address of square s on G will overlap square $c_{kl}$ on the canvass, where k=u−j, and l=v+i Transposition may take place through "π rotation" in which the address of square $s_{ij}$ on G will overlap square $c_{kl}$ on the canvass, where k=u−i, and l=v−j The π-rotation is equivalent to successive applications of either two clockwise transposition or two counterclockwise transpositions.

Accordingly one party would communicate the pinning of a graphlet to the canvass by passing on 1. the graphlet id 2. the canvass pinning address (the square on the canvass where the pinning square of graphlet fits) 3. Any transpositions: V, H, L, R where V stands for vertical flip, H stands for horizontal flip, L stands of counterclockwise rotation of 0.5π, and R stands for clockwise rotation of 0.5π. With this information the recipient party will know exactly how to pin the graphic letter to the canvass.

Letter Transposition: Every graphic letter may give rise to 4!=24 additional letters, by transposing the letters in the graphlet. The parties may agree on an order: X Y Z W as the basic order and specify a transposition like Z W X Y, which will be interpreted as replace every square marked X in the letter with a square marked Z, replace any square marked Y with a square marked W, and similarly Z→X and W→Y. If the pre-transposition letter is BitMap compliant, so is the transposed.

BitMap Key Construction Strategies

The basic procedure for defining a BitMap key—a graph—is to pick a large enough canvass, of p rows and q columns, mark all of its p*q squares with W, and then pin on the canvass letters from the graphic alphabet, making sure that no letter exceeds the boundaries of the canvass, and also making sure that no square of any graphlet overlaps another letter on the canvass. We discuss two questions: building an effective graphic alphabet, and pinning strategies.

Building an Effective Graphic Alphabet: A simple alphabet will be the set of 'atomic' graphlets—all the combinations of 3×3 tables compliant with the BitMap-lattice terms, mainly allowing from any square to move across edges to any other letter from the alphabet through squares that are all the same marking as the starting square. Each such atom will be assigned an ID and the transmitting party will identify the id, the pinning square of the canvass, and any transposition that may be chosen. A more advanced strategy would be to construct graphlets in a wide array of size, shape and letter assignment so that by specifying the id of a letter (in the open) the adversary does not know if the graphlet is small or large and of course not what are its letter markings.

One strategy is to have a few very large graphlets, a few more medium size, and many more small size, including atoms, that can be pinned between odd-size larger graphlets. It is of a clear advantage to build a very large alphabet, so as to use each letter fewer times to frustrate cryptanalytic efforts. It is also of a clear advantage to reserve some letters without use so that they can be used for the first time when top security is needed. As far as ID is concerned it is advantageous to enumrate the letters from 1 to l letters, and then designate a letter i (i=1,2, . . . l) as k=i MOD l. If l is kept secret then citing the same letter twice will not be obvious. Letter i can designated as a positive integer k or a different positive integer h, h≠k, as long as h=k=i MOD l.

Graphiet Pinning Strategy: Before pinning a graphlet on the canvass, the canvass as a whole is marked with the letter W on each of its p×q squares. The size of the key should be commensurate with the size of the message. In order to prevent any leakage of the key, it will make sense for the pinning party to resort to randomness. Consulting randomness sources, the pinning party will do:

1. randomly select a graphic letter (graphlet) 2. randomly apply any of the methods of transposition over the selected graphic letter 3. randomly select a pinning address on the canvass. 4. Check that (i) no square of the letter falls outside the boundaries of the canvass, and (ii) no square of the letter overlaps with a square of another letter already pinned to the canvass. 5. if check (4) fails return to step 1, otherwise continue 6. pin the selected graphic letter as selected, and note the pinning information: letter-id, canvass coordinates, transposition 7. Check the canvass to evaluate whether the key is sufficiently constructed. Stop if yes, continue to step 1 if not.

When the canvass is fully pinned (the BitMap key fully constructed) then the pinning party transmits the pinning data noted in step 6 above to all the recipient parties so that they can construct a replica of the key.

Mapping Bit Strings to Plaintext Alphabet

The requirement here is to map the original alphabet of the message to be encrypted to the three letters plaintext alphabet: X, Y Z. This can be done in several ways. One could limit the original message to capital English letter (26 in count) and in that case map each English letter to a pair of the three letters—a $3^2=27$ distinct pairs. More conveniently one could use Base64 as the original language and then map each of the 64 symbols to a string of three plaintext letters. There are $3^3=81$ distinct threesome strings, which is 17 more strings than required for Base64 representation. These extra strings can be used for a variety of administrative tasks, or ignored. One could also use a somewhat diminished ASCII table where instead of the 256 options a 5 letters string comrpising $3^5=243$ options will take care of most of it (minus 13).

Whatever the choise, it has to be shared between the communicating parties.

Preparation

1. The group of communication parties, the "Group," agree on a shared BitMap software, shared alphabet and shared use policy.

2. The Group agrees on a mapping procedure of an arbitrary bit string to the plaintext alphabet.

Encryption and Transmission

One important advantage of the canvass based BitMap key construction is that the user, who is most knowledgeable as to the security requirements for the data he intends to release into hostile territory, can unilaterally decide on how much security to project with this data transmission. That is because the key is not fixed, but decided by the parties. Mostly by the transmitter. The parties may decide on the size of the canvass and on the identity and the number of graphic letters they would pin on it. In particular if the canvass is chosen so that the full length of the encrypted plaintext (summary of all the used messages) can fit on the canvass without re-visiting squares, and if the pinned graphlets are "virgins"—never been used before, then the security of the ciphertext will be a "Vernam grade", mathematical secrecy, because one could color the canvass so as to match the ciphertext to any desired plaintext of the limited length.

The data transmitter uses his understanding of the circumstances to make unilateral decisions on the projected security of the BitMap-lattice cipher. They decide on: (i) the size of the canvass, (ii) the pinning strategy of graphlets on the canvass board, and (iii), the starting square on the canvass for the message under consideration. (by convention that starting point is a square marked W). The transmitter then does:

1. Map the plaintext from its native (original) language to the plaintext alphabet. $P_o \rightarrow P_p$ 2. Process the plaintext-alphabet plaintext to the REO-alphabet version: $P_p \rightarrow P_r$.

3. Pad one or two WW at both end of the REO alphabet written plaintext. 4. Build a sequence of visited canvass squares (starting from the starting square on the canvass), according to the sequence expressed in $P_r$, allowing for inflated plaintext, as necessary by the construction of the graph, starting with the designated starting point. 5. Once the plaintext pathway is marked on the canvass, it is expressed in the language of up, down, right, left, starting from the starting point. 6. The up, down, right, left (U,D,R,L) sequence is the ciphertext, C, and is transmitted to the intended recipient. The marking of a pathway is often open for choice. Let L be any REO letter {X, Y, Z, W}, and let L' be any other REO letter, L≠L'. The plaintext in REO alphabet is a sequence of pairs of the form LL'. At a given point some of the plaintext has already been drawn on the canvass, and now the pathway is on a canvass square marked L and the plaintext is up to some L is drawn on the canvass. The next letter in the REO plaintext (the plaintext written in the REO letters) is L'. Because the canvass in total is BitMap-compliant, we are assured that there is a sequence of adjacent canvass squares which are all marked L except the last one marked L'{LL . . . L'}. That sequence of adjacent squares can be described by some sequence of up, down, right left. This extra (inflated) sequence is added to the up-down-right-left sequence so far. When this sequence will be marked on the same canvass by the intended reader it will translate to the originating sequence LL . . . L'. The reader well knows that the plaintext is written without repetition, and hence all the L letters from the first until L' are a result of having to pass through so many L squares to reach to the desired L' square, and they would all collapse to the pair LL' to represent the plaintext in the REO alphabet. Often there are several pathways leading from L to L'{LL . . . L'}$_1$, {LL . . . L'}$_2$ . . . Each of them will qualify since the reader will collapse all of them to LL'. The choice among the many options may be made through a variety of considerations.

As a matter of convenience the REO sequence, $P_r$ may be headed by a W or a pair or W, and terminated also by a W or a pair of W. That way, upon looking at a sequence it is clear where it starts and where it ends. Accordingly the starting point on a canvass, as well as the ending point will be a W marked square.

Receiving and Decrypting

The intended recipient receives from the transmitter the size of the canvass, the marking of the canvass (which graphlets to pin on the canvass board and where—including any transposition of the original graphlet), and the starting point.

The recipient then receives the ciphertext (a sequence of four letters U, D, R, and L) and draws the recpevie pathway on the canvass beginning with the starting point. Once drawn the recipient reads the same pathway by listing in order the markings of the squares where the pathway is drawn. This is the 'inflated plaintext' because it normally is full of repetition. Any repetition in the plaintext listing is then collapsed so all LLLLLLLLLL'→LL' for L and L' two different letters from the REO alphabet. Once reptition is eliminated the resulting plaintext looks exactly as the REO plaintext that generated the pathway in the first place. Once the REO plaintext is extracted the recipient takes the same steps the trasmitter took only in reverse. The recipient first removes the W markings from the REO plaintext to build the plaintext in the plaintext letters X, Y, Z. The plaintext letters plaintext is then mapped back to the original language of the plaintext. so we have $P_{inflated} \rightarrow P_r \rightarrow P_p \rightarrow P_o$, and thereby the recipient is in possession of the original message the trasmitter wished to transmit to the recipient.

BitMap Implementation Management

BitMap implementers will focus on:
1. hardware v. software 2. key management 3. enabling user control Key Management The BitMap cryptographic key, the BitMap map is most secure if assembled when needed using high quality randomness, and is erased from memory after all supported messages arrived well in their destination. This will secure users from If users erase the plaintext or re-write it then security is bolstered. One may divide keys to be allocated for different grades of security requirements. For sufficient low security transmission a canvass setting may remain in tact for several sessions and for longer time. The important premise is that the users of BitMap-lattice can credibly estimate the vulnerability of their transmission. That is because cryptanalysis has only one route—brute force. There is no complex math to crack.

Enabling User's Control

The message transmitter who is in the best position to know the security requirements of the transmission is the one who decides on the key—the pinned canvass. So security is tailored to requirements. In contrast to using a fixed cipher of fixed security for low and high security requirements.

Composite Ciphertext Applications

BitMap-Lattice may be used to construct a composite ciphertext, C. A composite cipher, C is a ciphertext which decrypts to arbitrary number t of plaintexts, $P_1, P_2 \ldots P_t$, each through its respective key: $K_1, K_2, \ldots K_t$. where:

$P_i = DEC(C, K_i) \ldots$ for $i=1,2, \ldots t$

DEC is a decryption process. We describe first how to use BitMap-Lattice for a dual plaintext ciphertext and then extend it to larger numbers. We consider two distinct plaintexts P and P'. One encrypts each plaintext in the basic procedure as described above. As a result there is a canvass board, B where P results in a pathway, interpreted as a cipher C, and also there is a canvass board B' where P' results in a pathway interpreted as a ciphertext C'. The marked board B is the BitMap key, K such that C=ENC(P, K), where ENC is a BitMap encryption procedure. The marked board B' is BitMap key, K' such that C'=ENC(P',K'). Since the canvass boards may be made at a desired size we can agree on making both of them of same size of p x q squares.

The two ciphertext pathways are charted such that they start at a specified square on the left side of the canvass and end at a specified square on the right side of the canvass. To insure that it is necessary that the right most squares on the canvass will have at least one square marked W, And the same for the rightmost squares, they will have to include a square marked W. Let's first agree for simplicity that both the left side starting square and the right side termination square are d squares below (down) the top square on the canvass. d is a positive integer smaller or equal to p (d≤p). One now puts canvass board B' adjacent to canvass board B (B||B') such that the right side of board B touches the left side of board B'. This will create a combined canvass BB' where pathway C and pathway C' connect into one continuous pathway C". [C+C'=C"]. The writer of C" will communicate to the intended reader of P the new double size canvass board, BB', and mark board B' as virgin—namely without graphlets, all the squares on the canvass are marked W. The writer of C" will then communicate C" to the intended reader of P. The intended reader will then interpret the first part of C", which is C as plaintext P. The remaining ciphertext pathway, which is C' reads as a sequence of W marked squares to the intended reader of P, so it will not change the reading of C", which will be exactly as the reading of C, namely C P and C→P.

The writer of C" will then communicate C" to the intended reader of P'. The part of C" that reflects the encryption of P will be all marked W, The intended reader will then interpret the second part of C", which is C' as plaintext P'. Namely C' P' and C" P'.

So both intended readers will refer to the same canvass board comprised of p×2q squares. Both will get the same pathway written as up, down, right, left. However the keys these readers will use will be different. The readers intended to read P will see graphlets pinned to the left side of the combined canvass board, and will see the entire right half of the canvass board marked W, while the intended reader of P' will see the left half of the combined canvass board marked W and will see graphlets pinned onto the right part of the combined canvass board. Combining t plaintexts will be carried out in a similar way. t canvass boards which each represent a BitMap encryption of the respective plaintext will be lined up adjacent to each other, and the respective pathways will be strung to a single long path on the combined canvass board. The reader intended to read plaintext $P_i$(i=1,2, . . . t) will use a key that reflects the marking of canvas i ($K_i$) which is adjacent to canvas (i−1) on its left and is adjacent to canvas (i+1) on its right, while the rest of the path (that traverses from the first canvass to to canvass (i−1) and from canvass (i+1) to canvass t, will be W marked throughout. As a result the intended reader for $P_i$ will evaluate the ciphertext C to plaintext $P_i$. Of course, the t canvasses may be put together one on top of the other, adjacency in a vertical way, or in some mixed way. The principle to follow is to string together the individual pathways into a combined pathway and mark off with W, the parts of the pathway which decrypt to plaintext one does not wish a particular reader to read. A certain reader may be given more than one key and so read in the ciphertext C more than one message. Ahead we discuss some more detailed issues: (i) insuring pathway across each canvass; (ii) preventing pathway leakage.

Insuring Pathway Across the Canvass

The procedure for composite ciphertext calls for individual pathways for the involved plaintexts to be stretched from the left side of the canvass to the right side of the canvass. The question arises. A pathway to express a given plaintext P may end up in the middle of a graphlet, with no ability to connect to W marked canvass square outside the graphlet, to be extended towards the right side of canvass. In that case the plaintext may be redrawn to end it with such a W marked square that an extension to the right side will be possible. A rigorous way to insure that any plaintext message written on its p×q size canvass will result in a pathway stringing from the left side to the right side is to use atomic graphlets of size 3×3. and insure that each graphlet is surrounded by a ring of W marked squares (16 in count). In this configuration every square where the path stops may be extended through W marked squares to the right side of the canvass board.

Preventing Pathway Leakage

It is of value to draw the relatively long stretches of W to and from the right and left side of the canvass in a form that would resemble the form of the pathway as it traverses through the graphlets. This will prevent an observer from distinguishing between message bearing pathway and W marked pathway.

Onion Encryption

Let M be a message encrypted through BitMap-lattice into a pathway comprised of a starting section S, a termination section T and an in between section ω comprised of WWWW . . . W. This pathway is encrypted to VDRL letters ciphertext and given to a first reader who then reads message M, having decrypted it on her canvass. Section ω on the above pathway may be divided to a starting section S' and termination section T' and an in between section ω', comprised of WWWW . . . W. In other words the W-only section above, is being remarked such that only a central section ω' is W marked and the section at the start and end of ω are marked with all REO letters so that they carry an additional message M'. The newly marked pathway has the same ciphertext as written in UDRL letters. But the intended reader has a canvass where the original ω section conveys an additional message M'. That reader will read M+M'. The above procedure can be repeated iteratively: section ω' can be re-marked such that it will feature a starting section S", a termination section T" and an in between WWW . . . W marked section ω". This newly marked pathway, used over a canvass that expresses this new marking will extract, again, from the very same ciphertext (written in URLD letter) message M+M'+M", and so on indefinitely. This onion configuration can be collapsed to be "one sided onion", namely the header or the trailer section will be eliminated.

Post Quantum Technology

The common strategy to guard security against the onslaught of quantum computing is to increase the mathematical complexity to be negotiated by quantum computers. This strategy is quite suboptimal because (i) cryptanalytic complexity of elaborate algorithms cannot be objective established, and (ii) quantum computing is advanced in secret, one does not know how powerful these new machine will be tomorrow.

We propose an alternative strategy where defense is based on equivocation. Let a ciphertext C be a composite cipher, as described above. A cryptanalyst holding C if extremely powerful will conclude that the plaintext $P_1, P_2, \ldots P_t$ are each associated with a likelihood $\eta_i$ for i=1,2, . . . t to be the plaintext that was actually used to construct C. We can write: $\Sigma \eta_i = 1$. The distribution of the $\eta_i$ values reflects the degree of cryptanalytic equivocation. If $\eta_i=1$ and $\eta_j=0$ for j=1,2, . . . (i-1),(i+1), . . . t, then there is zero equivocation. if $\eta_i=1/t$ for i=1,2, . . . t then equivocation is maximized. There are several ways to build an exact metric of equivocation but it is not central to this matter before us. We will show that BitMap can be constructed so as to increase the terminal equivocation of the ciphertext to a "Vernam level" defined as follows:

Let $\eta'_1, \eta'_2, \ldots \eta'_t$ be the probability distribution of the t plaintexts $P_1, P_2, \ldots P_t$ before the cryptanalyst has captured C. Then maximum ciphertext equivocation is defined as a situation where $\eta'_i = \eta_i$ for i=1,2 . . . t.

Let C* be a ciphertext with no retracing, that means, the traversed canvass squares are not revisited. Or in other words, there are no loops in the pathway that represents the ciphertext. We recall that the ciphertext is a sequence of up, down, right, left (U, D, R, L) beginning with the starting square and ending with the terminating square, both, by agreement, a W. This sequence marks visited squares. If C* has no retracing, no revisiting of squares then the respective canvass will have to be large enough, which is acceptable because the transmitter chooses the canvass' dimensions. Let |C*| represent the size of C*, namely the number of 'turns' or the number of URDL letters in it. Let P be an arbitrary plaintext of size |P| measured by the count of REO letters in it. We further restrict the size of P to be smaller or equal to the size of C*: |P|≤|C*|. We now show that one could mark the canvass in such a way that when used to decrypt C* the output will be the arbitrary plaintext P. This is shown as follows: Draw any canvass large enough to accommodate the full geometry of C*. If |P|=|C*| then mark the |C*| canvass squares with the |P| letters in P. Mark the remaining squares on the canvass in an arbitrary way which still leaves the canvass as a whole BitMap-compliant. The resulting canvass, by construction will decrypt C* to P. If |C*|-|P|=e then replace any arbitrary REO letter in P with e letters of the same identity. This will expand P to P* where the size of P* equals to the size of C*: |P*|=|C*|. Now treat |P| as above. This will like above, evaluate C* to P*, which will be deflated to P by collapsing the e-count repetition in P* to a single letter.

Since this argument applies to an arbitrary P where |P|≤|C*|, it figures then that the identity of C* does not change the a-priori likelihood of any so qualified P to be the one that generated C*. In terms of the above notations we write $\eta'_i = \eta_i$ for i=1,2, . . . t. which is the definition of mathematical secrecy.

In practice it means that a transmitter of a message can transmit it on a canvass of sufficient size, as long as the transmitter and the recipient share sufficient number of "virgin" graphlets which have never been used before, and now they can be pinned on the canvass board such that the transmitted message can be marked on these graphlets without revisiting any canvass square twice or more. And because of that, a transmitter will be able to keep its cryptanalyst in terminal confusion even if the transmitter and the recipient share only one virgin graphlet. The transmitter then will have to limit the size of the message to fit to the size of the graphlet, but the transmitter will then be able to inflate the ciphertext to a much larger size, and mark the inflated ciphertext without revisiting of canvass squares, sending it over to the transmitter. The recipient will quickly collapse the inflated ciphertext to the proper small message, but the cryptanalyst will have to allow for any plaintext of any size up to the size of the ciphertext to be the generating plaintext. If this no repetition, no loops requirement is relaxed and one two or three loops appear then the perfect secrecy will deteriorate but considerable intractability will remain in force. This analysis calls for communication partners who exchange graphlets to leave a few graphlets in a virgin state, so that if it so happens that a transmitter finds it necessary to transmit a highly sensitive message, they will have the means to do so.

Internet of Things Applications

Unlike main stay cryptography, BitMap-Lattice ciphers rely on the most basic computational operations, and build their security on sufficiently large key. This configuration is especially attractive for IoT applications. Memory is cheap and getting cheaper, and power is rather costly. The BitMap cipher is battery friendly and hardware attractive.

Hardware Implementation

Both the ciphertext and the plaintext in its various forms (except the original) are written with a four letter alphabet, which means that a pair of bits can be assigned to represent a letter of that alphabet. And also, every list of bits, which has even number of bits can be represented as a BitMap ciphertext or a BitMap plaintext. Accordingly a canvass empty, or pinned can be represented as a matrix of p rows and 2q columns of bits. A canvass by its nature will be implemented through flesh drive or other matrix oriented memory. By contrast the graphlets, which at this point we will assume all of them to be rectangular will be comprised of matrix of u rows and 2v columns, to contain uv BitMap letters. The graphlets will be etched as a hardware chip so that the graphlets cannot be hacked. Upon construction of the canvass, the transmitter will inform the recipient on which graphite to pin where and thereby construct the canvass. When the transmission terminates the canvass may be wiped clear (return to all W state) and no record of it may be kept anywhere—no need.

Graphlets may be assembled on a graphic alphabet board. In that implementation they may call for standard size graphlets, each comprised of u rows and v columns, where u divides p (with no remainder) and similarly v divides q, so that $(q/u)*(p/v)$ graphlets fit on the p*q size canvass. This will allow for $$4^{(q/u)*(p/v)}$$

distinct canvasses. A group of users may share a hardware board with graphlets, then talk among themselves with ad hoc canvasses that may be defined over asymmetric cryptography for security vis a vis other members of the group.

Operational Summary of the BitMap Method

BitMap is a method for transmitting a secret arbitrary string of bits, B, by first rewriting B as a sequence of three letters X, Y, and Z, then, injecting a letter W to remove all letter repetition (XX→XWX, YY→YWY, ZZ→ZWZ) creating "Repetition Eliminated Order" (REO) expression of B, then using B in the form of the REO-expression as a "travel guide" to walk over a "travel map" comprised of p*q stepping stones organized in p rows and q columns where each stone is marked by one the letters X, Y, Z, W (the plaintext alphabet), such that from every stepping stone marked with any letter L of that alphabet there exists a pathway comprised of vertically adjacent, or horizontally-adjacent stepping stones leading to any letter L' L of the plaintext alphabet, such that the intervening stepping stones are all marked with letter L, and then the travel path is marked on the stepping stones, this travel path is identified as a series of steps across adjacent stepping stones where these steps are marked by their direction, namely Up, Down, Right, Left marked by the letters U, D, R, L, so that the travel path is fully defined by identifying the starting stepping stone then listing the sequence of U, D, R, and L that defines the travel path, (the ciphertext); the transmitter then transmits the identity of the stepping stone where the travel pass begins, and transmits the travel path in the form of the ciphertext to the intended recipient who is in possession of the same travel map of p rows and q columns of the marked stepping stones, and then the intended recipient marks on the travel map the identified stepping stone where the travel path begins, then, the intended recipient marks from that starting stepping stone the travel path in the form of the ciphertext, and these markings are used by the intended recipient to identify the markings of the stepped over stepping stones which is equivalent to B in the REO format except that some letters show repetition, then the intended recipient removes the repetition by replacing repetitive occurrences of letter L with a single letter L, and then the intended recipient removes all occurrences of letter W from the travel sequence, and by doing so the recipient reconstructs B in the XYZ expression, and then, the intended recipient maps B from the XYZ expression to the original bit expression and thereby B is transmitted to the intended recipient, leaving any other recipient of the ciphertext, but without knowledge of the travel guide, without means for extracting B from the ciphertext.

The principle method is further defined wherein the travel map is first prepared by marking the letter W on all the p*q stepping stones, and then overlaying r stepping stones with an overlay pattern that overwrites the original W with a letter of the plaintext alphabet (X, Y, Z, W) as marked on the overlay pattern ("overlay"), and then repeating this overlay action with the same or different overlay pattern, so that no two overlays overlap, and no overlay has any part thereto outside the p*q stepping stones, until the travel map is sufficiently overlaid, and where the letter markings of the plaintext alphabet on each overlay comply with the requirement that all r stepping stones overlays in the overlay pattern are continuous, namely every stepping stone overlay has at least one other stepping stone in the overlay in a way where one step either horizontal or vertical will move a traveler between these two stepping stones overlays, and where from every stepping stone overlay marked with letter L of the set X Y, Z, W there exists a sequence of overlay stepping stones comprised of stepping stones overlays that are either vertically adjacent or horizontally adjacent, wherein the sequence is terminated by any letter L'≠L of the set X, Y, Z, W, and where all the intervening stepping stones overlays are marked with letter L, such an overlay is regarded as map-compliant. The principle method is further defined wherein transmitter and recipient share a library of pattern overlays, and where the transmitter prepares a travel map by placing certain pattern-overlay from the library on certain positions on the travel map and then the transmitter notifies the recipient which pattern overlays from the shared library are placed where on the travel map, so that transmitter and recipient share the same travel map, but a third party, not aware of the secretly shared pattern overlays does not know how to convert the ciphertext to the plaintext.

The principle method is further defined wherein t bit strings $B_1, B_2, \ldots B_t$ are each expressed as t travel paths on t travel maps $M_1, M_2, \ldots M_t$, and where these t travel maps are put adjacent to each other to construct a composite travel map, allowing for a travel path to extend throughout the composite map, and where the t travel paths are connected to each other via stepping stones marked by either the letter at the end of the first travel path of the two connecting travel paths or the marking of the first stepping stone of the second travel path of the two connecting travel paths, thereby creating one composite travel path marked over the composite travel map evaluating to the t bit strings $B_1, B_2, \ldots B_t$, and where one will remove the overlays used to construct pathway i (i=1,2, ... t) and leave the original W markings on the un-overlaid stepping stones, then the composite ciphertext will evaluate to $B_1, B_2, B_{i+1} \ldots B_t$, and where removal of all overlays used to construct pathways 1,2, ... (i−1), (i+1) ... t leaving only the overlays used to construct pathway i (representing B) then the composite ciphertext on the composite travel map will evaluate to $B_i$.

The principle method is further defined wherein the travel map is comprised of l layers of two dimensional canvasses (p*q stepping stones), and both the plaintext expression of the pathway and the directional expression of the pathway (the ciphertext) include steps to move to the layer Above (letter A), and a step to move to the layer Below (letter B), thereby the pathway may switch to the next upper or the next lower canvass and continue to move from stepping stone to stepping stone in each canvass before switching to another canvass, or terminating.

Operational Summary of the BitMap System

BitMap is a system for transmitting a secret arbitrary string of bits, B, involved a transmission and encryption station, and a receiving and decrypting station, by the transmission and encryption station first rewriting B as a sequence of three letters X, Y, and Z, then, injecting a letter W to remove all letter repetition (XX→XWX, YY→YWY, ZZ→ZWZ) creating "Repetition Eliminated Order" (REO) expression of B, then using B in the form of the REO-expression as a "travel guide" to walk over a digital memory device serving as a "travel map" comprised of p*q memory locations housing two bits each, organized in p rows and q columns where each memory location is marked by one the letters X='00', Y='01', Z='10', W='11' (the plaintext alphabet), such that from every memory location marked with any letter L of that alphabet there exists a pathway comprised of vertically adjacent, or horizontally-adjacent memory locations leading to any letter L' L of the plaintext alphabet, such that the intervening memory locations are all marked with letter L, and when the travel path is marked on the memory locations, this travel path is identified as a series of steps across adjacent memory locations where these steps are marked by their direction, namely Up, Down, Right, Left, marked by the letters U, D, R, L, so that the travel path is fully defined by identifying the starting memory location then listing the sequence of U, D, R, and L that defines the travel path, (the ciphertext); the transmission and encryption station then transmits to the receiving and decrypting station the identity of the memory locations where the travel pass begins, and then the transmission and encryption station transmits the travel path in the form of the ciphertext to the receiving and decrypting station which is in possession of the same digital memory device of p rows and q columns of the memory locations, marked with a letter of the plaintext alphabet, and then the receiving and decrypting station marks on its equivalent digital memory device, also regarded as the travel map, the identified memory location where the travel path begins, and from that memory locations the receiving and decrypting station marks the travel path in the form of the ciphertext, and these markings are used by the receiving and decrypting station to identify the markings of the travel-path visited memory locations which is equivalent to B in the REO format except that some letters show repetition, then the receiving and decrypting station removes the repetition by replacing repetitive occurrences of letter L with a single letter L, and then the receiving and decrypting station removes all occurrences of letter W from the travel sequence, and by doing so the recipient reconstructs B in the XYZ expression, and then, the receiving and decrypting station maps B from the XYZ expression to the original bit expression and thereby B is transmitted from the transmission and encryption station to the receiving and decrypting station, leaving any other recipient of the ciphertext, but with no possession of the digital memory device serving as travel guide, without means for extracting B from the ciphertext.

The BitMap system described above is further specified wherein the digital memory device serving as the travel map is first prepared by marking the letter W on all the p*q memory locations, and then overlaying r memory locations with an overlay sheet that overwrites the original W with a letter of the plaintext alphabet (X, Y, Z, W) as marked on the overlay sheet ("overlay"), and then repeating this overlay action with the same or different overlay sheet, so that no two overlays overlap, and no overlay has any part thereto outside the digital memory device, until the digital memory device is sufficiently overlaid, and where the letter markings of the plaintext alphabet on each overlay comply with the requirement that all r memory locations overlays in the overlay sheet are continuous, namely every memory location overlay has at least one other memory location in the overlay in a way where one step either horizontal or vertical will move a traveler between these two memory locations overlays, and where from every memory location overlay marked with letter L of the set X Y, Z, W there exists a sequence of overlay memory locations comprised of memory locations overlays that are either vertically adjacent or horizontally adjacent, wherein the sequence is terminated by any letter L'≠L of the set X, Y, Z, W, and where all the intervening memory location overlays are marked with letter L, such an overlay is regarded as map-compliant.

The BitMap system described above is further specified wherein the transmission and encryption station and the receiving and decryption station share a library of pattern sheets, and where the transmission and encryption station prepares a travel map by placing certain sheet-overlay from the library on certain memory locations on the travel map and then the transmission and encryption station notifies the receiving and decryption station which sheet overlays from the shared library are placed where on the travel map, so that the transmission and encryption station and the receiving and decryption station share the same travel map, but a third party, not aware of the secretly shared p overlay sheets does not know how to convert the ciphertext to the plaintext.

The BitMap system described above is further specified wherein t bit strings $B_1, B_2, \ldots B_t$ are each expressed as t travel paths on t digital memory devices serving as travel maps $M_1, M_2, \ldots M_t$, and where these t travel maps are put adjacent to each other to construct a composite travel map, allowing for a travel path to extend throughout the composite map, and where the t travel paths are connected to each other via memory locations marked by either the letter at the end of the first travel path of the two connecting travel paths or the marking of the first memory location of the second travel path of the two connecting travel paths, thereby creating one composite travel path marked over the composite travel map evaluating to the t bit strings $B_1, B_2, \ldots B_t$, and where one will remove the overlay sheets used to construct pathway i (i=1,2, . . . t) and leave the original W markings on the un-overlaid memory locations, then the composite ciphertext will evaluate to $B_1, B_2, B_{i+1} \ldots B_t$, and where removal of all overlay sheets used to construct pathways 1,2, . . . (i−1), (i+1) . . . t leaving only the overlay sheets used to construct pathway i (representing $B_i$) then the composite ciphertext on the composite travel map will evaluate to $B_i$.

The BitMap system described above is further specified wherein the travel map is comprised of l layers of two dimensional canvasses (p*q stepping stones), and both the plaintext expression of the pathway and the directional expression of the pathway (the ciphertext) include steps to move to the layer Above (letter A), and a step to move to the layer Below (letter B), thereby the pathway may switch to the next upper or the next lower canvass and continue to move from stepping stone to stepping stone in each canvass before switching to another canvass, or terminating.

Meta Lattice BitMap

The BitMap-Lattice described so far was based on 3 plaintext letters alphabet (4 for the REO version), and 4 directional, or ciphertext letters commensurate with the 4 directions marked on a two-dimensional canvass. Both the plaintext alphabet and the directional alphabet may be extended. The directional alphabet may be extended independently but the plaintext alphabet is limited by the dimensionality of the canvass.

We first discuss meta lattices—canvasses of three or more dimensions, then we discuss larger plaintext alphabet, followed by a discussion of the operational differences relative to the basic 2D lattice.

Meta Lattices (Larger Ciphertext Alphabet)

The BitMap graph may be configured as squares (or stepping stones) arrayed in three dimensions rather than two. The squares will be marked by the plaintext alphabet whether it is the basic 3 letter alphabet or more. The pathway on the 3D canvass requires 6 directional indications rather than four as is the case with 2D canvass. We therefore extend the directional indications to:

Up, Down Right, Left, Above, Beyond {U, D, R, L, A, B}.

A pathway defined as a string of these 6 letters will be able to unambiguously mark any path on the 3D canvass. The upgrade from 4 letters to 6 requires a new bit expression for these letters. 4 letters can be expressed with a pair of bits each. 6 letters requires 3 bits. There are 8 distinct 3 bits letters. This means that two letters are available but not used to describe the pathway. We will marked these two letters as One (O), and Two (T), so the full range of 3 bits letters will be: U, D, R, L, A, B, O, T. Since the letter O and T are not used to express the ciphertext (the pathway), they can be used to express open ended meta data. That is because two letters can be used to express any digital message.

This is of great advantage; the row ciphertext may be handled with administrative descriptive data. Meta-BitMap Ciphertexts can now be written with headers, trailers, and in between markers, comprised of the letter O and T.

For examples: let a pathway be P=UARRLDDBULLAA. P may be bounded by a header H=OOT, and a trailer T=TOO. To assemble a transmittable package constructed as Header-Payload-Trailer=H–pathway–T:

Packaged Ciphhertext: OOT UARRLDDBULLAA TOO

The raw ciphertext (the payload) may be marked by injecting into it markers comprised of any length strings comprised of the letters O and T. This can be used both for administration and for obfuscation.

Larger Plaintext Alphabet

It is impossible to build a BitMap-compliant graphlets with a REO alphabet of five letters or more. This statement is a conjecture at this point with no proof. However it is possible to construct a 6 letters three dimensional graphlet, as illustrated below:

We consider a 4×3×3 box, comprised of three 2D plates as follows:

plate 1

U V U

U U U

U U U

U U U plate 2

V X U

X X X

Y W Z

Y Z Z plate 3

V U V

V V V

V V V

V V V

When packed together to a 4×3×3 graphlet the result will be a BitMap-compliant graphlet. From every letter there is a path to any other letter comprised only of the same letter squares (we keep the name squares but they can also be called cubes, or stepping stones).

Since we only use 6 letters in constructing the graphlet, we can add two letters. The reason is the same as with the ciphertext alphabet. To express 6 symbols with binary bit it is necessary to use 3 bits per letter. But once three bits are used, one has at his disposal 8 letters. 6 are used to mark the cubes on a 3D canvass, and two are left for administrative purposes.

Illustration: let a REO plaintext be written as P=XYYUZXVVZYWZ. It can be bound by a header OTT and a trailer TTO to look:

{Plaintext package}=OTT XYYUZXVVZYWZ TTO

The REO plaintext (the payload) may be injected with any message comprised of the two non-payload letters O and T. Like it is with 2D, the REO plaintext is constructed of the plaintext message, which in this case is comprised of 5 letters: X, Y, Z, U, and V. Like before any repetitions broken by injecting the letter W: XX→XWX, YY→YWY, ZZ→ZWZ, UU→UWU, and VV→VWV. Using 5 letters to express an arbitrary plaintext one could use combination of 3 letters that would yield $5^3$=125 options which is almost half the size of the ASCII table.

Operating Meta Lattice BitMap

There are various combinations that will work in the meta-lattice domain. The canvass may be 2D (two dimensional), and be pinned with 3D graphlets, or the canvass may be 3D and be pinned with 2D graphlets or 3D graphlets. 3D graphlets may be written with a 4 letter REO alphabet or a 6 letters REO alphabet. The 3D expansion allows for special operational advantage. We discuss hierarchical composite cipher.

Meta Lattice Hierarchical Composite Cipher

We consider a case where the plaintext REO letters may be 4 or 6 letters but the directional alphabet is comprised of 6 letters: UDRLAB. We construct a composite canvass comprised of h two dimensional (2D) canvasses laid on top of each other. We number the lowest canvass 1, and the highest h. We consider a situation where a message M is to be distributed to a community of readers. This community is organized in a h-layers hierarchy. For any set of reasons M may be comprised of parts that must not be exposed to a first group of reader. Within that exclusive part there is a part that should not be exposed to another group of people, and so on. Group h of people is allowed to read all. This can be accomplished with h overlaying 2D canvasses where the message is written into a pathway that traverses canvass 1, but then at some point is has an "above" (A) letter in it. This directs the path to hop up to the next higher up 2D canvass. Now for some readers canvasses 2-h are empty (W-marked). So until the pathway returns to the first canvass the pathway looks to them as purely W—and collapses. However if at some point the pathway drops back (through B letters on the plaintext string) to the first canvass, then from that point on the message will be properly interpreted. In other words, the group-1 people who use canvass 1 only see the portions of the pathway that wriggles its way in canvass low. Parts of M to be excluded from group 1 and from group 2, are marked on canvass 3 above canvass 2, and when such a message is encountered, the pathway rises to canvass 3. And so on. When the narrative that is written is canvass i (i=1,2, . . . h) is followed by narrative that fits group (i–1) readers, the pathway drops down to that canvass and below towards group (i–1). This is very much like the 2D situation only that it is easier to implement since the key (graphlets positions) for each level are associated with the proper canvass. This canvass separated messaging invites an easy hardware implementation where the canvasses are physical plates latched into a reader, and various readers get different canvasses, some W-washed and some full key featured.

In piling up the canvasses on top of each other it may be a good idea to have a layer of W-washed squares between the canvasses so that a composite message can properly align itself when moving from layer to layer.

The 2D canvasses that layer up to define a 3D canvass may be seen as fitted with one fixed graphlet, especially over hardware implementation.

Use Cases

The meta-lattice BitMap hierarchy may be used in quite a few situations:

1. disjoint messaging 2. hierarchical security 3. hierarchical focus

In all use cases there is the advantage for passing all the messages to all concerned readers in every which order. Every reader takes in what is for it, and passes the composite ciphertext along. Disjoint messaging is where the holders of a 2D canvass interpret in the ciphertext a message aimed at them which has no relationship to other messages in the ciphertext. In a strict hierarchy—the higher canvass (h) reads more than the lower canvasses admit, and so each canvass reads the messages of its own level and the levels below. This can be used for security. Describing an issue in generalities for all intended readers—using canvass 1. Adding some sensitive material not to be read by some—this is written in the 2nd canvass, and so on. Another application is 'focus'. A message M may be stated in brief—only its skeleton so to speak. Beyond that there is a first level of elaboration, then a second and a third. Statement may be supported with proof, with explanation, with identification of sources. Hard facts may be accompanied with human interest anecdotes, etc. Every such expansion of the skeleton will be written in a higher canvass. In that situation all the readers will have all the canvasses but decide initially only to latch in canvass 1—to read the summary only without being clouded with details, then they may opt for the first then the second elaboration etc. They will want to see sources and justification of statements, etc.

Hierarchical Security: A very efficient way to create a composite ciphertext for enhanced security is to use a method that is similar to the one described in the hardware implementation section herewith. There, some t 2D canvasses were layered together (with empty—W marked—2d canvasses between them). The canvasses featured 4 REO letters alphabet, while the ciphertext (directional) language was based on 6 directions: up, down, right, left, above, and below. This allows the pathway to shift from one 2D canvass to the next (next up or next down) and so express a message in each 2D canvass that would readable by anyone holding the marked canvass, while it will remain secret for anyone who has an empty canvass instead. This per canvass messaging may be used for a classical composite cipher, but it can also be used for obfuscation. One could employ artificial intelligence to select most confusing message over all the (t–1) canvasses that are there for confusion of the attacker—while only one canvass carries the intended message. The higher the value of t, the greater the confusion, the stronger the secrecy.

Two communication partners may share t 2D canvasses properly layered as described herein, but for any particular message or session they may a-priori agree (or otherwise secretly) on a subset of s≤t canvasses that would carry the message, while the other (t-s) canvasses will feature decoy messages. Some AI may be used to make these decoy messages most effective. There is a special efficiency in the combination of 4 letters REO plaintext alphabet and 6 letters ciphertext (directional) alphabet.

Hardware

The involved 2D canvasses may be manufactured like a micro SD and be latched into an array of canvass holder. For example phones may be fitted with three or four micro SD slots to converse securely with a communication partner in possession of one or more of these canvasses. The idea here is to express an arbitrary bit string B with three letters X, Y, Z. For example expressing a list of 243 symbols by all possible 5 combinations of the letters X, Y, Z ($3^5$=243), but to express X, Y, Z not with 2 bits which would have been enough, but rather with 3 bits each. There are 8 possible combinations for a three bits strings. So one can use 5 more letters. One of these five will be W as used before—to break off any repetition. Then we can use a letter A to indicate a shift from one 2D canvass to the one Above, and a letter B to indicate shifting to a canvass Below. This will figure in a case where l layers of 2D canvasses of similar size are placed fittingly one on top of the other, and the pathway can at any stage depart from the canvass where it is drawing and instead go up to the parallel canvass which may be square-marked differently. Or it may shift down to the 2D canvass below. Unlike the repetition elimination over X, Y, Z, repetition in the form of AA will not be broken. It indicates migration to the 2D canvass 2 counts above. Likewise for BB, no W will be placed to break the repetition. It will indicate ,migration 2 2D canvasses below. We can agree that if A is encountered while the pathway is pointed to the top canvass then another A will indicate shifting to the bottom canvass, and if a B is encountered while the pathway is pointing to the bottom 2D canvass then the focus will be shifted to the same square on the top 2D canvass. Say then that all the canvasses may be accessed with either repetitive use of A or through repetitive use of B. The last two letters will be One and Two (O and T)—a binary set that can be used for meta data as described above. Between any two 2D canvasses marked with XYZW squares there will be a 2D empty canvass marked with only W squares. This is necessary so that each canvass may deliver any arbitrary message. When the pathway shifts from one XYZW marked 2D canvass up, it first shifts to an empty canvass. On it the pathway moves around until it find a square marked as required by the message to be expressed in the upper canvass, and when such a W square is found, the pathway indicates another A (going above). Similarly on the way down. The pathway first goes through an empty 2D canvass, where it can wander among the various W marked squares until it finds the right mark square for the message to be expressed in the lower 2D canvass. We note that by agreement, all messages begin and end with a W. An additional empty 2D canvass will be placed below the lowest canvass or above the highest 2D canvass. Illustration: message M1, M2, and M3 are: M1=XYYZX, M2=YXXZYZY, M3=XXXY. The three message become REO: M1'=XYWYZX, M2'=YXWXZYZY, M3'=XWXWXY. The pathway will start at the lower canvass where repetition will expand M1', M2' and M3' to:

M1 =XXXXYYWWYYZZZZXX;
M2=YYYYXXXWWXZYYYZZYYY,
M3=XXWXWWXXXXY.

The combined pathway will start at the lowest 2D canvass as M1'=XXXXYYWWWYYZZZZXX. It will then be added an A to migrate the pathway to the empty 2D canvass above the lowest canvass. There the pathway will migrate through 4 W letters until it can proceed to a square marked Y as required by M2', then it will be added another letter A to express the fact that the pathway now climbs to one higher up 2D canvass where message M2' is drawn as a pathway. The pathway so far will look like this:

M+M2'=XYXXYYWWWWYYZZZZXX AWWWWA YYYYXXXWWWXZYYYZZYYY AWWA XXWWXWWXXXXY

When the pathway finished representing M2' it can turn to M3'. To do this, we need to add another A to the developing plaintext string, to send the pathway to the empty canvass between canvass 2 and canvass 3. There it will roam until it find an X square to do through to mark M3' on the third canvass. The result:

M1'+M2'+M3'=XXXXYYWWWWYYZZZZXX AWWWWA YYYYXXXWWWXZYYYZZYYY AWWA XXWWXWWXXXXY

This now fully developed pathway will be translated to a directional ciphertext comprised of the indications; up, down, right, left, above and below, or U, D, R, L, A, B. Each letter in the plaintext version of the pathway will be matched by a directional letter of the ciphertext expression of the pathway.

C=Encryption(M1'+M2'+M3')
C=UUDLRRDUDURRUUULRU ARRRUA UUDL UUDLUURDDDRRDDRRUDL ARRA UURRRLLUURL For purpose of illustration let's assume that the transmitter wishes to add a message M1" to be written on the first (lowest) canvass. Let M"=XXYYZ. It will become REO: M1'"=XWXYWYZ. To add M1'" to C the message writer will append C with B three times to go first to the empty canvass below canvass 3, then to go to canvass 2, then go down once more to the empty (W marked) canvass between canvasss 1 and canvass 2. There the pathway will roam around the W marked squares until it can move to an X marked square. It will then go down (another B) once more and then chart M1'":

M1'+M2'+M3'+M1'"=XXXXYYWWWWYYZZZZXX AWWWWA YYYYXXXWWXZYYYZZYYY AWWA XXWWXWWXXXXY BBBWWWB XWXYWYZ

And the corresponding ciphertext:
C=Encryption(M1'+M2'+M3'+M1'")
C=UUDLRRDUDURRUUULRU ARRRUA UUDLUURDDDRRDDDRRUDL ARRA UURRRLLUURL BBBRUUN UURRDDL The ciphertext C will be sent to the recipient together with the starting square. If the recipient has the three effective canvasses, she will readd the entire message: M1'+M2'+M3'+M1'". A recipient who only has canvass 2, and for him canvass 1 and canvass 3 are empty will interpret the ciphertext to:

+M2'+=WWWWWWWWWWWWWWWWWW AWWWW YYYYXXXWWWXZYYYZZYYY AWWA WWWWWWWWWWWW BBBWWWB WWWWWWW

And she will eliminate all the W letters, A letters and the B letters, and remain with:
M2'=YYYYXXXWWWXZYYYZZYYY
→M2=YXXZYZY A recipient having only the first canvass will see:
M1'++M'"=XXXXYYWWWWYYZZZZXX AWWWWA WWWWWWWWWWWWWWWWWWWWW AWWA WWWWWWWWWWWW BBBWWWB XWXYWYZ And she will eliminate all the W letters, A letters and the B letters, and remain with:
M1'++M1'"=XXXXYYWWWWYYZZZZXX XWXYWZ M1+M1"=XYYZX XXYYZ Procedural Summary of Meta Lattice The 3D meta lattice is a method for transmitting a secret arbitrary string of bits, B, by first rewriting B as a sequence of five letters X, Y, Z, U and V, then, injecting a letter W to remove all letter repetition (XX→XWX, YY→YWY, ZZ→ZWZ UU→UWU, VV→VWV) creating "Repetition Eliminated Order" (REO) expression of B, then using B in the form of the REO-expression as a "travel guide" to walk over a "travel map" comprised of p*q*l stepping stones organized in p rows and q columns forming a layer, laid of by additional (l−1) layers where each stone is marked by one of the letters X, Y, Z, U, V, W (the plaintext REO alphabet), such that from every stepping stone marked with any letter L of that alphabet there exists a pathway comprised of vertically adjacent, or horizontally-adjacent, or third-dimension adjacent stepping stones leading to any letter L'≠L of the plaintext REO alphabet, such that the intervening stepping stones are all marked with letter L, and then the travel path is marked on the stepping stones, this travel path is identified as a series of steps across adjacent stepping stones where these steps are marked by their direction, namely Up, Down, Right, Left, layer-Above, layer Below marked by the letters U, D, R, L, A, B so that the travel path is fully defined by identifying the starting stepping stone then listing the sequence of U, D, R, L, A and B that defines the travel path, (the ciphertext); the transmitter then transmits the identity of the stepping stone where the travel pass begins, and transmits the travel path in the form of the ciphertext to the intended recipient who is in possession of the same travel map of p rows, q columns and l layers of the marked stepping stones, and then the intended recipient marks on the travel map the identified stepping stone where the travel path begins, then, the intended recipient marks from that starting stepping stone the travel path in the form of the ciphertext, and these markings are used by the intended recipient to identify the markings of the stepped over stepping stones which is equivalent to B in the REO format except that some letters show repetition, then the intended recipient removes the repetition by replacing repetitive occurrences of letter L with a single letter L, and then the intended recipient removes all occurrences of letter W from the travel sequence, and by doing so the recipient reconstructs B in the XYZUV expression, and then, the intended recipient maps B from the XYZUV expression to the original bit expression and thereby B is transmitted to the intended recipient, leaving any other recipient of the ciphertext, but without knowledge of the travel guide, without means for extracting B from the ciphertext.

The method above is further specified wherein the travel map is first prepared by marking the letter W on all the p*q*l stepping stones, and then overlaying t stepping stones with an overlay pattern that overwrites the original W with a letter of the plaintext alphabet (X, Y, Z, U,V, W) as marked on the overlay pattern ("overlay"), and then repeating this overlay action with the same or different overlay pattern, so that no two overlays overlap, and no overlay has any part thereto outside the p*q*l stepping stones, until the travel map is overlaid to a desired measure, and where the letter markings of the plaintext alphabet on each overlay comply with the requirement that all t stepping stones overlays in the overlay pattern are continuous, namely every stepping stone overlay has at least one other stepping stone in the overlay in a way where one step either horizontal or vertical or to the layer above perpendicular to horizontal and vertical, or to the layer below perpendicular to the horizontal and vertical, will move a traveler between these two stepping stones overlays, and where from every stepping stone overlay marked with letter L of the set X Y, Z, U,V, W there exists a sequence of overlay stepping stones comprised of stepping stones overlays that are either vertically adjacent or horizontally adjacent, or above-layer adjacent or below-layer adjacent wherein the sequence is terminated by any letter L'≠L of the set X, Y, Z, U, V, W, and where all the intervening stepping stones overlays are marked with letter L, such an overlay is regarded as map-compliant.

The method above is further specified wherein transmitter and recipient share a library of pattern overlays, and where the transmitter prepares a travel map by placing certain pattern-overlay from the library on certain positions on the travel map and then the transmitter notifies the recipient which pattern overlays from the shared library are placed where on the travel map, so that transmitter and recipient share the same travel map, but a third party, not aware of the secretly shared pattern overlays does not know how to convert the ciphertext to the plaintext.

The method above is further specified wherein t bit strings $B_1, B_2, \ldots B_t$ are each expressed as t travel paths on t travel maps $M_1, M_2, \ldots M_t$, and where these t travel maps are put adjacent to each other to construct a composite travel map, allowing for a travel path to extend throughout the composite map, and where the t travel paths are connected to each other via stepping stones marked by either the letter at the end of the first travel path of the two connecting travel paths or the marking of the first stepping stone of the second travel path of the two connecting travel paths, thereby creating one composite travel path marked over the composite travel map evaluating to the t bit strings $B_1, B_2, \ldots B_t$, and where one will remove the overlays used to construct pathway i (i=1, 2, . . . t) and leave the original W markings on the un-overlaid stepping stones, then the composite ciphertext will evaluate to $B_1, B_2, \ldots B_{i-1}, B_{i+1} \ldots B_t$, and where removal of all overlays used to construct pathways 1,2, . . . (i-1), (i+1) . . . t leaving only the overlays used to construct pathway i (representing $B_i$) then the composite ciphertext on the composite travel map will evaluate to $B_i$.

Rock Canvass

Merging BitMap lattice with the rock of randomness (U.S. Pat. No. 10,467,522) allows for high security communication. The two communication partners, each has a copy of a rock of randomness wherein an array of p * q conductivity measuring ports are marked. Each port may be regarded as a stepping stone, $s_{ij}$, is the port on row i (i=1, 2 . . . p) and column j (j=1,2, . . . q). The array of ports as a whole may be regarded as the rock canvass.

Because of the special rock design it is highly expected that the resistance between two arbitrary port $s_{ij}$ and $s_{kl}$ will be different then the conductivity between $s_{ij}$ and any other port in the array. If that is not the case, then this rock is discarded, and a new rock is measured. Since these conductivity measurements are only known to parties in possession of the rock, then a transmitter may indicate the next stepping stone from a given stepping stone by specifying the conductivity measurements between the given port to the target port. The intended recipient who possesses a copy of the rock will readily find the target stepping stone, but other would not. So unlike the standard BitMap-lattice method where the directions taken by the pathway are known to all (only the markings of the stepping stones are secret), with a canvass constructed fro a rock of randomness the direction of the pathway remains unknown to the attacker. The transmitter will identify the starting port, then submit successive conductivity measurements to the recipients. With the rock canvass the graphlets that are overlaid on the rock don't have to BitMap-lattice compliant in terms of the conductivity condition. They will have the freedom to mark the stepping stones of the graphlet randomly as long as there are roughly the same number of stepping stones (squares) marked with each of the plaintext letters. So for the standard 4 REO letters each graphlet comprising r stepping stones will feautre roughly r/4 stones marked X, r/4 stones marked Y, r/4 stones marked Z, and r/4 stones marked W REO. Because the continuity condition is relaxed it will be possible to construct two dimensional graphlets featuring 6 REO letters: X, Y, Z, W, U, V , each of them will have to mark roughly r/6 of the stones in the graphlet.

Advanced Rock Canvass

In the basic Rock Canvass methodology the path may be limited to adjacent ports vertically or horizontally to be otherwise consistent with the basic BitMap-lattice approach. However, a well constructed rock will be sufficiently random and diverse that a more direct approach will be effective. It is described as follows. A group of communication partners will share identical copies of a well manufactured rock of randomness. They will decide to capture an arbitrary string of bits by dividing it to strings comprising oft bits each. Thereby such string will be expressed through an alphabet comprising $2^t$ letters. The parties will then fit each rock of randomness with $p=n2^t$ well placed ports, where n is a positive integer, preferably as high as practical. "Well placed" may be at random, or it may be over geometrically well configured array, such that each port is identified by the row and the column that defines it on the array of ports. The parties will then assign an id to each port. This can be done by its placement in the array. The parties will then randomly assign to each port a letter from the $2^t$ letter alphabet. This will result in each letter appearing about n times in the list of p ports. Everything done so far will be shared by the parties.

When a transmitter wishes to send a message M to an intended recipient with whom the above procedure was shared, then the transmitter selects a port marked with the first letter of the message M (a letter from the plaintext alphabet—comprised of $2^t$ letters), and sends its identity to the recipient. Then the transmitter identifies a port assigned to the the next letter in M (there are roughly n ports to choose from). The transmitter then measures the conductivity (or resistance) between the first port (the first stepping stone), $s_0$, and the selected port marked with the 2nd letter in M—port $s_1$. This resistance is $\rho_{01}$. The transmitter communicates $\rho_{01}$ to the intended recipient sharing the rock and this procedure. The rock being well built will not measure the exact resistance $\rho_{01}$ between port $s_0$ and any other port j j=1,2, . . . p. Thereby the intended recipient will now identify the first and the second letters in M. The transmitter then read the next letter in M (the next string oft bits), and randomly pick a port $s_3$ that is marked by this third letter in M.

The transmitter will then connect $s_0$ and $s_1$ into one pole and then measure the effective resistance between this combined pole (from port s&inde0 and port $s_1$): $\sigma^*_{12}$, where the "*" signifies that the resistance is measured when all the poles used so far are connected into a combined shared pole. The measured resistance will be communicated to the intended recipient. The intended recipient will do the same—namely combine ports $s_0$, $s_1$ to a single pole, and search around to find a port that agrees with the communicated measured resistance. Thereby the intended recipient will find $s_2$, and since it shares the letter assignments of ports with the transmitter, the recipient will identify the third letter in M. This will continue so that after the first i letters in M have been securely transmitted to the recipient, the transmitter will spot a port $s_i$ that represents letter (i+1) in M, then connect all the ports $s_0$, $s_1$, $s_2$ . . . $s_i$ to be of the same polarity electrically and measure the effective resistance between this combined polarity and port $s_{i+i}$, then communicate the measurement of $\rho^*_{ii+1}$ to the recipient for the recipient to find the identity of the (i+1) letter in M. This will continue until M if fully communicated to the recipient, or until the transmitter runs out of previously untapped ports on the rock for a particular letter. In that case the transmitter will tell the recipient that a new pathway will be started and so a new $s_0$ will be selected and communicated to the recipient, and the process will repeat as above. By combining the ports $s_0$, $s_1$, . . . $s_i$ to be one pole, and measuring the effective resistance between this combined pole and port one creates a reading that depends on the pathway so far. This reading is not likely to be repeated even if the same plaintext is sent again, because the selection of the next port is done with randomness. In general the selection of the next port will be one physically close to the current port, to make the search for it by the recipient faster. This method maximizes the use of the core randomness built into the rock.

Illustration: Using t=2 one expressed digital strings as a strings comprised of $2^2$=4 letters (X, Y, Z, W). We select n=3, and then fit a rock of randomness with 3+4=12 ports, arrayed as a matrix. We then assign these ports with letter markings as follows:

```
X  X  Y  W

Z  X  Z  Y

Z  W  Y  W
```

The marked rocks are shared by the transmitter and the recipient. The transmitter wishes to send to the recipient message M=YWXXZ. The transmitter will then choose a port marked Y as starting point for the pathway. The transmitter chooses the port on column 4 on the 2nd row: $s_{24}$, and communicates this address to the recipient. Now the recipient knows that the first letter in M is Y.

The transmitter will then wish to indicate to the recipient that the second letter in M is W. To that end the recipient will measure the resistance between the starting port and the port in the first row and 4th column, $s_{14}$. It is found to be $\rho(0,1)$=43 (in some pre selected resistance units). If the rock is well structured then all resistance measurements from the starting port to all other ports is different. The transmitter will communicate $\rho(0,1)$=43 to the recipient, and thereby the recipient will know to check all the applicable resistance measurements on its rock and conclusively identify $s_{14}$ port as the one where the path has proceeded, and then the recipient will also know that W is the second letter in M. The third letter in M is X. The transmitter identifies $s_{22}$ as X. The transmitter now unites port $s_{24}$ with port $s_{14}$, and applies the opposite electrical charge to port $s_{22}$, the result $\rho^*(1,2)$=57 in some agreed upon units. This measurement is communicated to the recipient. One may note that the measurement from the established configuration of uniting ports to a single electrical pole (charge) creates a different resistance measurements from simply measuring the resistance between port $s_1$&indecx4 and $s_{22}$. The measurement of 57 is communicated to the recipient. The recipient also unites $s_{24}$ and $s_{14}$ to a single pole and searches for the port that produces a $\rho$ reading of 57. Thereby the recipient identifies port $s_{22}$ and from there, identifies letter X as the third letter in M.

The 4th letter in M is another X so the transmitter combines the three ports that comprise the pathway so far into one electrical charge, and measures the resultant resistance from $s_{11}$ to be 82. This measurement is communicated to the recipients who identifies port $s_{11}$ as the next port and hence realizes that X is the next letter in M.

And so forth. If the supply of any letter is exhausted, a new pathway begins.

Qtext

Post Quantum Cryptography: Pivoting to Ciphertext Size

The Definitive Answer to the Security Threat Posted by Quantum Computing is Ciphertext Size Introduction Entanglement mystery is only being scratched. Its practical computational potential is not yet bound, and hence the resistance of the new so called "post quantum" complexity amassing ciphers is an open question. It appears that security is dead. Soon everything that goes online will be an open book. Quantum computing is such a different direction away from Turing machines that to confront this threat one is challenged to come up with a solution equally novel compared to the direction cryptography has been evolving in the Turing machine decades. The key word that reflects the edge of quantum computing over the common Turing computing is 'uncertainty', 'equivocation'. The key word that reflects the edge of post-quantum cryptography is the same: uncertainty, equivocation. Consider something called composite ciphertext. It is a piece of data that can be decrypted with one key to yield one plaintext, but when decrypted with another key it yields a different plaintext. Same ciphertext evaluates to two distinct plaintexts—depending on which key is used. We can call it a "qtext" akin to "qbit". A qtext will resist any quantum cryptanalysis because it does not contain the key that decrypts it to the generating plaintext. If the key is not in the qtext then no computer, quantum or otherwise, can find it there. The most powerful cryptanalyst will end up with terminal equivocation unable to decide which plaintext is concealed by it. By contrast, AES ciphertext hides the key used to generate it. A composite ciphertext, qtext, may comprise many more plaintexts than two—unlimited number of plaintexts in fact. What is the price we pay for hiding our message in a forest of equally likely message candidates? We end up with a proportionally large ciphertext. The more equivocation we desire, the larger the ciphertext we need to generate. The AES user, is helpless. They have no control over the security that protects their data. Now let's turn the page to the new world of true post-quantum cryptography. The user is in the driver's seat. The user who knows best how sensitive a piece of data is, she is the one who determines how much security to use for it. For not very sensitive data, the composite cipher will be relatively small. For top security data, the qtext will be so large that Shannon's mathematical secrecy will apply. And then all that the user will have to worry about is to safeguard the key they used. The ciphertext, the qtext, is perfectly secure.

Counter Cryptanalysis

Modern cryptography relies and nurses from abstract mathematics, which also taints it with an academic flair alien to its 'street fight' disposition. Adi Shamir predicted that ciphertexts will not be cracked, rather by-passed. It is therefore of some interest to approach the cryptographic play box with the adversarial impact as the starting point. Before proceeding with the adversarial starting point one should mention that not all cryptography is adversarial, and the following will not apply there. Cryptography may be used to control data exposure to different parties cooperating on a project; cryptography may be used for timed-released of information—both instances are non-adversarial. Yet, by and large, cryptography is used in adversarial circumstances when two player maneuver for relative advantage generally in a zero sum configuration. That means a gain for one party is loss to the other. The cryptography user, the 'cryptographer' and the cryptanalyst are sparring for advantage. The common approach today is for the cryptography user to apply cryptographic means that are considered universally applicative—providing security against any and all adversaries. In other words the crypto user, call her 'user' generally does not bother herself with characterizing who will try to gain advantage by cracking her ciphertext, she rather constructs a ciphertext that is associated with a mathematical premise that satisfies her that any cryptanalyst whoever they may be will not be able to harm her by cryptanalyzing the cipher she releases to the open. As a result the main stay cipher project a fixed measure of security on all data they protect. That measure is not modifiable by the user, and is determined by the underlying algorithm. Since ciphers come with no proof of efficacy, they quickly collapse to a few 'star ciphers' which undergo more academic scrutiny, and attract more and more users, and their popularity becomes a positive feedback cycle that makes these 'stars' into staples. And thereby they offer widely used stationary targets to cryptanalytic shops who characteristically crack these ciphers for a period of time before this breach is suspected. The counter-cryptanalysis approach, on the other hand, is rooted with the perception of threat, and the means to counter it. It regards a cryptanalyzed ciphertext according to its impact on the campaign against the adversary. It calls for use of cryptography in a form of dis-cryptography, luring the adversary to misallocate resources on misleading cryptanalytic challenges. It is concerned with the question of how to best allocate one's own resources to upgrade the chance to prevail in the match. We discuss the following options: 1. variable security cryptography 2. false cryptanalytic challenges 3. misleading cryptography 4. warning cryptography Variable security cryptography is a technique where a data transmitter matches security of transmitted data to the expected damage should this data be exposed to the adversary. In false cryptanalytic challenge, one drains the adversary's resources into cryptanalytic efforts of messages that are either bogus, or of minor importance in terms of the active race for bilateral dominance. In misleading cryptography one projects encrypted messages, one expects the adversary to crack, and treat as genuine, taking counter steps expected by the message sender and creating thereby an advantage to the sender. In warning cryptography, one hides an important message deeper, 'below', another encrypted message, designed to cause the adversary to take a particular step. The user watches the battleground. As long as the expected step was not taken, one considers that warning message to still remain secure—and hence so is the deeper message. All the above strategies can also be taken in combination.

Variable Security Cryptography

We consider a crypto user releasing a message M to the public information highway. The user assumes the adversary captures M. Let $H_M=H(M)$ represent the harm done to the user as a result of her adversary getting possession of M, or more accurately from realizing that the user sent message M to a given recipient at a given moment in time. If $H_M$ is sufficiently limited then the user may not allocate any resources to minimize it. Otherwise the user will consider allocating resources at a measure $R_M$ such that the damage from sending M to its intended recipient $H'_M=H(M, R_M)$ will be smaller than the damage without applying R: $H'_M<H_M$. Damage reduction may occur in several ways: 1. steganography. 2. cryptography 3. dis-cryptography Common practice only wields encryption using a standard generally acceptable cipher. We will show how increased-ciphertext cryptography allows for steganography, variable strength cryptography and dis-cryptography. Nominal cryptography leaks a lot of information: the fact that a message of a given size was sent from the transmitter to the recipient. Using a decoy-tolerant cipher one would create a constant data flow that hides the extent of the real message traffic—steganography. Using composite ciphertext one would pack into the ciphertext t decoy messages M', M", M'" . . . where the selection of these add-on messages will be such that a super efficient adversary who extracts the real message M plus the t decoy messages, will be most confused by his inability to determine the intent of the transmitter. Example: a transmitter wishes to send price value for some asset. The price is X. A regular cipher will encrypt X, to Enc(X) and send the ciphertext to the recipient over the information highway. The adversary either cracks the encryption or not. The composite cipher user will send alongside X the values X' and X". However, if these X values are too close to each other, then the confusion by the adversary is very limited. Now let's say that $X_l$ and $X_h$ are the lowest reasonable price and the highest reasonable price respectively. By packing alongside X the values $X_l$ and $X_h$ the user will maximize the confusion of the adversary. Furthermore, a composite message that includes t equally spaced X values between $X_l$ and $X_h$ will not benefit the adversarial cryptanalyst in the case where the margins for errors or attention for X is $\delta X$ and $\delta x \geq (X_h-X_l)/t$ since they will leave the original spectrum of plausible X values untouched by the capture of such a ciphertext.

Warning Cryptography

Let D be an encrypted large data set, posted on the Internet. Let K be the key to decrypt it. Let k be a key to encrypt K: $C_k=Enc(K, k)$. Transmitter, T and recipient R may exchange k. So transmitter T may at will re-encrypt the posted data set D, using a new K, and then send the corresponding $C_k$ to recipient R. An adversary may be successful in cracking the encryption, extract K and read D. The transmitter may device a warning scheme. Let W be a piece of data of such nature that if known by the adversary, then the adversary will take some visible steps, which one will detect. In that case one would encrypt a plaintext combined of W and $C_k$, using another shared key k', and use the resultant ciphertext $C_w$ to pass K to the recipient. The recipient will decrypt $C_w$ using the shared key k', ignore W and use $C_k$ as a ciphertext to be decrypted to K. The adversary at some point may crack $C_w$, and uncover both $C_k$ and W. The knowledge of W will cause the adversary to react and take some action detectable by the user of the scheme. Once detected the scheme user will know that the outer protection of K (based on key k') has been peeled off, and that only the basic protection, the encryption based on k is left. The user might then re-encrypt D with a new key K and repeat the procedure above. This is an illustration for warning cryptography. Of course the adversary may suspect as much, and despite cracking $C_w$ and extracting W, will not behave in ways that will make it obvious to the scheme user that the first layer of encryption has been cracked. This is the cat and mouse game.

The Principle of Equivocation Invariance

Mathematical Secrecy v. Perfect Secrecy
(Academic Purity v. Practical Efficacy)

Claude Shannon famously proved that Vernam cipher projects mathematical secrecy in as much that any possible plaintext of the size of the ciphertext is an allowable plaintext candidate. He also proved that such a level of security requires for the key to be as large as the processed message. What then is the essential principle for Shannon's mathematical security? It is the principle of equivocation invariance. The Vernam ciphertext is inherently equivocated over the full range of all mathematically possible plaintexts. Anyone who knows the size of the ciphertext, but not its content will face the same equivocation as to the identity of the plaintext that generated that ciphertext. In other words awareness of the content of the ciphertext does not alter the state of equivocation relative to ignorance of the same. This notion of equivocation invariance is then the underlying principle of Shannon reasoning. Let's apply it to the real world. In any given situation if one knows that a message writer sent an encrypted message (ciphertext) to some intended reader, then the observer can attack a probability measure $\rho_i$ to the likelihood that message $m_1$ generated the ciphertext, and while i=1,2, . . . runs over all the possible messages of the size of the ciphertext or less, the values of the various $\rho_i$ do vary. Based on the circumstances some plaintext candidates are more likely than others. Using Shannon thinking we can define perfect secrecy as a case where knowledge of the content of the ciphertext, does not change the probability measures of the plaintext candidates—compared to analysis based only on the size of the ciphertext. Armed with this definition let's look at the extreme case where the content of transmitted ciphertext is expected to be binary: a yes or a no to a given yes/no question. The observer who is unaware of the content of the ciphertext faces this binary equivocation, the message may be yes or may be no. Now we consider a cipher text C with the following property. If it is decrypted with key $k_1$ it evaluates to plaintext $p_1$, and if it is decrypted with key $k_2$ then it evaluates to plaintext $p_2$. In that case the observer who is aware of the content of ciphertext C remains equivocated over whether C was generated by the yes answer ($p_1$) or by the no answer ($p_2$). Say then that much as is the case with Vernam cipher, knowledge of the content of the ciphertext does not impact the equivocation, the uncertainty, over the plaintext candidacy—perfect secrecy (regardless of the size of the key that generated the ciphertext. This binary case may readily be extended to any arbitrary number of plaintext candidates. And by the way, perfect secrecy is totally immunized against quantum computing. It is the way to project security in the first half the 21st century Seal Virginity Technology (SVL)

Expensive wine, expensive medicine, and other high-cost and rare products serve as a productive target for fraudsters and counterfeit criminals. When a container of some sorts is used then its opening is vulnerable. Standard threads, tables, and glue-ons are easily counterfeited so that the content of the container can be replaced, or diluted, and then be shipped with a re-fitted counterfeit seal to deceive the consumer. Proposing a new Seal Virginity Technology based on U.S. Pat. No. 10,467,522. Manufacturing a plastic rock. Melting it to plastic mellow ability then applying the malleable rock over and the around the opening of the protected container. Once fitted a special rock-meter is applied to the sealant rock, and t conductivity measurements are taken. s t are specified on the container and/or accompanying documentation. The SVL handled container is shipped to customers or middlemen. At any station the custodian of the device can apply rock-meter like the one used to measure the sealant in the first place, and then the custodian reads the rock metrics and compares them to the recorded values. If they agree—the seal is considered virgin. If not—counterfeiting is suspected. For greater assurance the custodian can measure the extra t-s measurements, and send them to the sealing agency to be compared the measurements to the unpublished (t-s) results. It is necessary to insure that it is infeasible to break the seal and then re-assemble it in a way that would make it invisible to inspection, and also preserve the original measurements of the sealant. The rock principle is randomness that cannot be recreated by the counterfeiters.

What is claimed is:
1. A method to achieve secret communication comprising a transmitting station and a receiving station, using tablets of two-dimensional bit memory lattices, "canvasses", embodied as micro SD, or in an equivalent bit memory device, or embodied in embedded computer memory inside the transmitting and inside the receiving stations wherein one is transmitting a secret arbitrary string of bits, B, regarded as "the plaintext", by first rewriting B as a sequence of three letters X, Y, and Z, then, injecting a letter W to remove all letter repetition (XX→XWX, YY→YWY, ZZ→ZWZ) creating "Repetition Eliminated Order" (REO) expression of B, where the four letters X, Y, Z, W are regarded as "the plaintext alphabet", marked by a pair of bits each, then using string B in the form of the REO-expression as a "travel guide" to move over a canvass comprised of microSD, or of an embedded two dimensional bit matrix comprised of $p*2q$ bits, p and q are positive integers, where each pair of bits represents one of the letters of the plaintext alphabet, and each letter is regarded as a "stepping stone", where the stepping stones are marked such that from every stepping stone marked with any letter L of that plaintext alphabet there exists a pathway comprised of vertically adjacent, or horizontally-adjacent stepping stone leading to any letter L' ≠L of the plaintext alphabet, such that the intervening stepping stones are all marked with letter L, the travel-guide serves to guide a path on the canvass stepping stones wherein the sequence of plaintext letters in the travel guide (the plaintext) will be the same as the sequence of letters on the path marked on the canvass, except for repetition, the travel path on the canvass will be defined by specifying the starting stepping stone, then iteratively indicating the next stepping stone by specifying in turn one of the four directions: up, down, right, left (U,D,R,L) until the last stepping stone, where the letters U,R,D,L, regarded as the "ciphertext alphabet" are also marked by a pair of bits each, thereby resulting in the travel path expressed as a bit string C, regarded as the ciphertext;

the transmission station then transmits the identity of the stepping stone where the travel pass begins, and transmits the ciphertext, C, to the receiving station, which is in possession of the same canvass of p rows and q columns of the marked stepping stones, and then the receiving station marks on the canvass at its possession the identified stepping stone where the travel path begins, then, the receiving station marks on its canvass, the starting stepping stone of the travel path then it uses the sequence of ciphertext letters in C (U,D,R,L) to mark the travel path on the canvass, and then it reads the plaintext letters identified on the stepping stones throughout the marked travel path, and then it eliminates any letter repetition in the sequence of plaintext letters read from the travel path, and thereby it retrieves the plaintext B written in the REO-expression.

2. The method of claim 1 wherein the travel map canvass is first prepared by marking the letter W on all the pq stepping stones, and then overlaying r stepping stones with an overlay pattern that overwrites the original W with a letter of the plaintext alphabet (X, Y, Z, W) as marked on the overlay pattern ("overlay"), and then repeating this overlay action with the same or different overlay pattern, so that no two overlays overlap, and no overlay has any part thereto outside the p*q stepping stones, until the travel map is overlaid to an arbitrary extent, and where the letter markings of the plaintext alphabet on each overlay comply with the requirement that all r stepping stones overlays in the overlay pattern are "continuous", namely, every stepping stone in the overlay has at least one other stepping stone in the overlay in a way where one step either horizontal or vertical will move a traveler between these two stepping stones overlays, and where from every stepping stone overlay marked with letter L of the set X Y, Z, W there exists a sequence of overlay stepping stones comprised of stepping stones overlays that are either vertically adjacent or horizontally adjacent, wherein the sequence is terminated by any letter L' L of the set X, Y, Z, W, and where all the intervening stepping stones overlays are marked with letter L, such an overlay is regarded as "map-compliant".

3. The method of claim 2 wherein transmitter and recipient share a library of pattern overlays, and where the transmitter prepares a canvass by placing certain pattern-overlay from the library on certain positions on the canvass and then the transmitter notifies the recipient which pattern overlays from the shared library are placed where on the travel map, so that the transmitter and the recipient share the same canvass, but a third party, not aware of the secretly shared pattern overlays does not know how to convert the ciphertext to the plaintext.

4. The method of claim 1 wherein t bit strings $B_1$, $B_2, \ldots B_t$ are each expressed as t travel paths on t canvasses, also regarded as "travel maps": $M_1, M_2, \ldots M_t$, and where these t canvasses are put adjacent to each other to construct a composite canvass, allowing for a travel path to extend throughout the composite canvass, and where the t travel paths are connected to each other via stepping stones marked by either the letter at the end of the first travel path of the two connecting travel paths or the marking of the first stepping stone of the second travel path of the two connecting travel paths, thereby creating one composite travel path marked over the composite travel map evaluating to the t bit strings $B_1, B_2, \ldots B_t$, and where one will remove the overlays used to construct pathway i (i=1,2, . . . t) and leave the original W markings on the un-overlaid stepping stones, then the composite ciphertext will evaluate to $B_1, B_2, B_{+1} \ldots B_t$, and where removal of all overlays used to construct pathways 1,2, (i-1), (i+1) . . . t leaving only the overlays used to construct pathway i (representing $B_1$) then the composite ciphertext on the composite travel map will evaluate to $B_i$.

5. The method in claim 1 wherein the travel map is comprised of l layers of two dimensional canvasses (p*q stepping stones), and both the plaintext expression of the pathway and the directional expression of the pathway (the ciphertext) include steps to move to the layer above (letter A), and a step to move to the layer below (letter B), thereby the pathway may switch to the next upper or the next lower canvass and continue to move from stepping stone to stepping stone in each canvass before switching to another canvass, or terminating.

6. A system for transmitting a secret arbitrary string of bits, B, comprising a transmission station and a receiving station, where each station is equipped with one or more exact copies of physical plates in a form of a micro SD flash memory, or an equivalent bit memory device, regarded as "canvass" or "travel map", comprising a two-dimensional bit array of p rows and $2q$ columns, where p and q are positive integers, and where each pair of bits represents one of the four letters X, Y, Z, and W, and where the transmitting station first writes an arbitrary bit string B as a sequence of three letters X, Y, and Z, then, injecting a letter W to remove all letter repetition (XX→XWX, YY→YWY, ZZ→ZWZ) creating "Repetition Eliminated Order" (REO) expression of B, then using B in the form of the REO-expression as a "travel guide" to walk over a digital memory device, the canvass, serving as a "travel map" comprised of p*q memory locations housing two bits each, regarded as "stepping stones" organized in p rows and q columns (two dimensional canvass) where each stepping stone is marked by one the letters X='00', Y='01', Z='10', W='11' (the plaintext alphabet), such that from every memory location stepping stone marked with any letter L of that alphabet there exists a pathway comprised of vertically adjacent, or horizontally-adjacent memory locations leading to any letter L' ≠L of the plaintext alphabet, such that the intervening memory locations are all marked with letter L, and where the travel path is marked on the stepping stones, this travel path is identified as a series of steps across adjacent memory locations where these steps are marked by their direction, namely Up, Down, Right, Left, marked by the letters U, D, R, L, so that the travel path is fully defined by identifying the starting memory location then listing the sequence of U, D, R, and L that defines the travel path, (the ciphertext);

the transmission station then transmits to the receiving station the identities of the stepping stone where the travel pass begins, and then the transmission station transmits the travel path in the form of the ciphertext to the receiving station which is in possession of the same digital memory device, canvass, of p rows and $2q$ columns of the memory locations, marked with a letter of the plaintext alphabet, and then the receiving station marks on its equivalent digital memory device, canvass, also regarded as the travel map, the identified stepping stone where the travel path begins, and from that stepping stone the receiving station marks the travel path in the form of the ciphertext, and these markings are used by the receiving and decrypting station to identify the markings of the travel-path visited stepping stones which is equivalent to B in the REO format except that some letters show repetition, then the receiving and station removes the repetition by replacing repetitive occurrences of letter L with a single letter L, and then the receiving station removes all occurrences of letter W from the travel sequence, and by doing so the recipient reconstructs B in the XYZ expression, and then, the receiving station maps B from the XYZ expression to the original bit expression and thereby B is transmitted from the transmission station to the receiving station.

7. The system of claim 6 wherein the digital memory device serving as the travel map is first prepared by marking the letter W on all the p*q memory locations, and then overlaying r memory locations with an overlay sheet that overwrites the original W with a letter of the plaintext alphabet (X, Y, Z, W) as marked on the overlay sheet ("overlay"), and then repeating this overlay action with the same or different overlay sheet, so that no two overlays overlap, and no overlay has any part thereto outside the digital memory device, until the digital memory device is overlaid to an arbitrary desired level, and where the letter markings of the plaintext alphabet on each overlay comply with the requirement that all r memory locations overlays in the overlay sheet are continuous, namely every memory location overlay has at least one other memory location in the overlay in a way where one step either horizontal or vertical will move a traveler between these two memory locations overlays, and where from every memory location overlay marked with letter L of the set X Y, Z, W there exists a sequence of overlay memory locations comprised of memory locations overlays that are either vertically adjacent or horizontally adjacent, wherein the sequence is terminated by any letter L' ≠L of the set X, Y, Z, W, and where all the intervening memory location overlays are marked with letter L, such an overlay is regarded as map-compliant.

8. The system of claim 6 wherein the transmission and the receiving share a library of pattern sheets, and where the transmission prepares a travel map by placing certain sheet-overlay from the library on certain memory locations on the travel map and then the transmission and station notifies the receiving station which sheet overlays from the shared library are placed where on the travel map, so that the transmission station and the receiving station share the same travel map, but a third party, not aware of the secretly shared p overlay sheets does not know how to convert the ciphertext to the plaintext.

9. The system of claim 6 wherein t bit strings B1, B2, Bt are each expressed as t travel paths on t digital memory devices serving as travel maps M1, M2, ... Mt, and where these t travel maps are put adjacent to each other to construct a composite travel map, allowing for a travel path to extend throughout the composite map, and where the t travel paths are connected to each other via memory locations marked by either the letter at the end of the first travel path of the two connecting travel paths or the marking of the first memory location of the second travel path of the two connecting travel paths, thereby creating one composite travel path marked over the composite travel map evaluating to the t bit strings B 1, B2, Bt, and where one will remove the overlay sheets used to construct pathway i (i=1,2, ... t) and leave the original W markings on the un-overlaid memory locations, then the composite ciphertext will evaluate to B 1, B2, ... Bi-1, Bi+1Bt, and where removal of all overlay sheets used to construct pathways 1,2, (i-1), (i+1) ... t leaving only the overlay sheets used to construct pathway i (representing Bi) then the composite ciphertext on the composite travel map will evaluate to Bi.

10. The system of claim 6 wherein the travel map is comprised of l layers of two dimensional canvasses (p*q stepping stones), and both the plaintext expression of the pathway and the directional expression of the pathway (the ciphertext) include steps to move to the layer Above (letter A), and a step to move to the layer Below (letter B), thereby the pathway may switch to the next upper or the next lower canvass and continue to move from stepping stone to stepping stone in each canvass before switching to another canvass, or terminating.

11. A method for transmitting a secret arbitrary string of bits, B, from a transmitting station to a receiving station where each station is in possession of a layered canvass comprised of l/layers of bit-lattices embodied in a micro SD, or in an equivalent bit memory device, each comprised of p*3q bits, where p, and q are positive integers, by first rewriting B as a sequence of five letters X, Y, Z, U and V, then, injecting a letter W to remove all letter repetition (XX→XWX, YY→YWY, ZZ→ZWZ UU→UWU, VV→VWV) creating "Repetition Eliminated Order" (REO) expression of B, then using B in the form of the REO-expression as a "travel guide" to walk over a "travel map" comprised of p*q*l stepping stones organized in p rows and q columns forming a layer, laid of by additional (l-1) layers where each stepping stone is marked by one of the letters X, Y, Z, U, V, W (the plaintext REO alphabet), each letter occupying 3 bits memory locations, such that from every stepping stone marked with any letter L of that alphabet there exists a pathway comprised of vertically adjacent, or horizontally-adjacent, or third-dimension adjacent stepping stones leading to any letter L' ≠L of the plaintext REO alphabet, such that the intervening stepping stones are all marked with letter L, and then the travel path is marked on the stepping stones, this travel path is identified as a series of steps across adjacent stepping stones where these steps are marked by their direction, namely Up, Down, Right, Left, layer-Above, layer Below marked respectively by the letters U, D, R, L, A, G so that the travel path is fully defined by identifying the starting stepping stone then listing the sequence of U, D, R, L, A and G that defines the travel path, (the ciphertext);

the transmitting station-then transmits the identity of the stepping stone where the travel pass begins, and transmits the travel path in the form of the ciphertext to the intended recipient receiving station which is in possession of the same travel map of p rows, q columns and l layers of the marked stepping stones, and then the receiving station marks on the travel map the identified stepping stone where the travel path begins, then, the receiving station marks from that starting stepping stone the travel path in the form of the ciphertext, and these markings are used by the receiving station to identify the markings of the stepped-over stepping stones which is equivalent to B in the REO format except that some letters show repetition, then the receiving station removes the repetition by replacing repetitive occurrences of every letter L with a single letter L, and then the receiving station removes all occurrences of letter W from the travel sequence, and by doing so the recipient reconstructs B in the XYZUV expression, and then, the receiving station maps B from the XYZUV expression to the original bit expression and thereby B is transmitted to the receiving station, leaving any other recipient of the ciphertext, but without knowledge of the travel guide, without means for extracting B from the ciphertext.

12. The method of claim 11 wherein the travel map is first prepared by marking the letter W on all the p*q*l stepping stones, and then overlaying t stepping stones with an overlay pattern that overwrites the original W with a letter of the plaintext alphabet (X, Y, Z, U,V, W) as marked on the overlay pattern ("overlay"), and then repeating this overlay action with the same or different overlay pattern, so that no two overlays overlap, and no overlay has any part thereto outside the p*q*l stepping stones, until the travel map is overlaid to a desired measure, and where the letter markings of the plaintext alphabet on each overlay comply with the requirement that all t stepping stones overlays in the overlay pattern are continuous, namely every stepping stone overlay has at least one other stepping stone in the overlay in a way where one step either horizontal or vertical or to the layer above perpendicular to horizontal and vertical, or to the layer below perpendicular to the horizontal and vertical, will move a traveler between these two stepping stones overlays, and where from every stepping stone overlay marked with letter L of the set X Y, Z, U,V, W there exists a sequence of overlay stepping stones comprised of stepping stones overlays that are either vertically adjacent or horizontally adjacent, or above-layer adjacent or below-layer adjacent wherein the sequence is terminated by any letter L' ≠L of the set X, Y, Z, U, V, W, and where all the intervening stepping stones overlays are marked with letter L, such an overlay is regarded as map-compliant.

13. The method of claim 11 wherein the transmission station and the receiving station share a library of pattern overlays, and where the transmission station prepares a travel map by placing certain pattern-overlay from the library on certain positions on the travel map and then the transmission station notifies the receiving station which pattern overlays from the shared library are placed where on the travel map, so that the transmission station and the receiving station share the same travel map, but a third party, not aware of the secretly shared pattern overlays does not know how to convert the ciphertext to the plaintext.

14. The method of claim 11 wherein t bit strings $B_1$, $B_2$, ... $B_t$ are each expressed as t travel paths on t travel maps, $M_1$, $M_2$, ... $M_t$, and where these t travel maps are put adjacent to each other to construct a composite travel map, allowing for a travel path to extend throughout the composite map, and where the t travel paths are connected to each other via stepping stones marked by either the letter at the end of the first travel path of the two connecting travel paths or the marking of the first stepping stone of the second travel path of the two connecting travel paths, thereby creating one composite travel path marked over the composite travel map evaluating to the t bit strings $B_1$, $B_2$, ... $B_t$, and where one will remove the overlays used to construct pathway i (i=1,2, ... t) and leave the original W markings on the un-overlaid stepping stones, then the composite ciphertext will evaluate to $B_1$, $B_2$, $B_{i+1}$ ... $B_t$, and where removal of all overlays used to construct pathways 1,2, (i-1), (i+1) ... t leaving only the overlays used to construct pathway i (representing $B_1$) then the composite ciphertext on the composite travel map will evaluate to $B_i$.

\* \* \* \* \*